United States Patent [19]

Yoshio et al.

[11] Patent Number: 5,065,252

[45] Date of Patent: Nov. 12, 1991

[54] METHOD AND APPARATUS FOR RECORDING AND REPRODUCING PICTURE INFORMATION ENABLING THE MIXING OF IMAGES OF A VIDEO FORMAT SIGNAL AND GRAPHIC CODES RECORDED ON A SINGLE RECORDING MEDIUM

[75] Inventors: Junichi Yoshio; Sumio Hosaka; Hisao Matsuoka; Youichirou Tsuda; Shoichi Katagiri, all of Tokorozawa; Satoru Nomura, Yamanashi, all of Japan

[73] Assignees: Pioneer Electronic Corporation, Tokyo; Pioneer Video Corporation, Yamanashi, both of Japan

[21] Appl. No.: 310,749

[22] Filed: Feb. 15, 1989

[30] Foreign Application Priority Data

Feb. 29, 1988 [JP] Japan .................................. 63-46605

[51] Int. Cl.⁵ .............................................. H04N 5/76
[52] U.S. Cl. .................................... 358/335; 358/343
[58] Field of Search ............... 358/335, 142, 147, 903; 360/35.1, 10.1, 14.1; 369/49, 48, 50

[56] References Cited

U.S. PATENT DOCUMENTS 4,635,136 1/1987 Ciampa et al. ..................... 360/14.1
4,872,067 10/1989 Okatani .............................. 358/342
4,894,732 1/1990 Ueda .................................. 358/342

FOREIGN PATENT DOCUMENTS 0214178 10/1985 Japan .................................. 358/342
0080690 4/1986 Japan .................................. 358/335

*Primary Examiner*—Roy N. Envall, Jr.
*Assistant Examiner*—Huy Nguyen
*Attorney, Agent, or Firm*—Fleit, Jacobson, Cohn, Price, Holman & Stern

[57] ABSTRACT

Method and apparatus of recording and reproducing picture information on a recording medium. In addition to video format signal and a coded information signal, graphic codes including picture information are recorded on the recording medium, by inserting the graphic codes as a subcode of the coded information signal. At the time of reproduction, a signal according to the graphic codes is mixed with the video format signal. When the recording medium is played back, a portion of the video format signal corresponding to a predetermined period of the video format signal readout from the recording medium is written in a memory, and the signal according to the graphic code is mixed with a still picture video format signal which is produced by repeatedly reading the stored content of the memory.

7 Claims, 25 Drawing Sheets

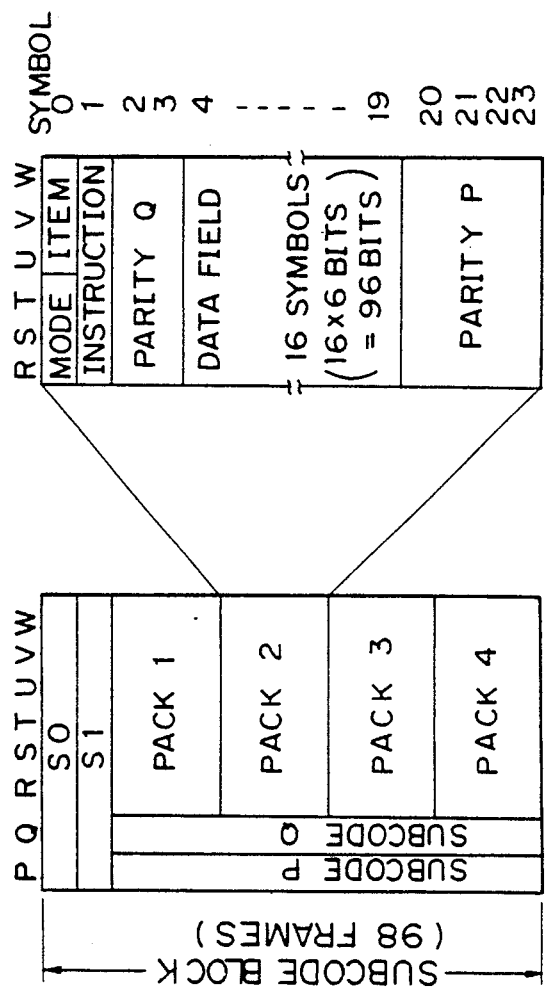
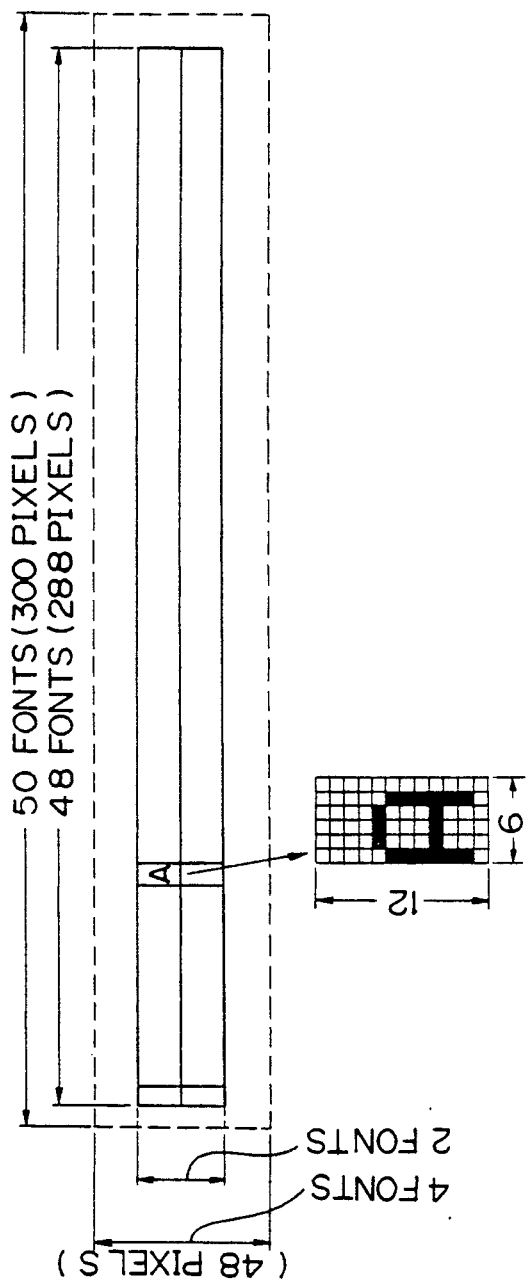
Fig. 1
Fig. 2

Fig. 4

| MODE | ITEM | |
|---|---|---|
| 0 0 0 | 0 0 0 | ZERO MODE |
| 0 0 1 | 0 0 0 | LINE-GRAPHICS MODE |
| 0 0 1 | 0 0 1 | TV-GRAPHICS MODE |
| 0 0 1 | 0 1 1 | GRAPHICS MODE WITH MOTION PICTURE |
| 1 1 1 | 0 0 0 | USER'S MODE |

Fig. 5

| SYMBOL | R | S | T | U | V | W |
|---|---|---|---|---|---|---|
| 0 | 0 | 0 | 1 | 0 | 1 | 1 |
| 1 | 0 | 1 | 1 | 1 | 0 | 0 |
| 2 | PARITY Q | | | | | |
| 3 | | | | | | |
| 4 | TCB-0 | | TCB-1 | | TCB-2 | |
| 5 | TCB-3 | | TCB-4 | | TCB-5 | |
| 6 | TCB-6 | | TCB-7 | | TCB-8 | |
| 7 | TCB-9 | | TCB-10 | | TCB-11 | |
| 8 | TCB-12 | | TCB-13 | | TCB-14 | |
| 9 | TCB-15 | | 0 | 0 | 0 | 0 |
| 10 | 0 | 0 | 0 | 0 | 0 | 0 |
| ⋮ | ⋮ | | | ⋮ | | |
| 19 | 0 | 0 | 0 | 0 | 0 | 0 |
| 20 | PARITY P | | | | | |
| ⋮ | | | | | | |
| 23 | | | | | | |

Fig. 6

| TCB | | MODE | SUBCODE PICTURE | MOTION PICTURE |
|---|---|---|---|---|
| 0 | 0 | TRANSPARENT MODE | 0 % | 100 % |
| 1 | 0 | MIXING MODE | M % | (100-M) % |
| 1 | 1 | NON-TRANSPARENT MODE | 100 % | 0 % |

Fig. 7

| SYMBOL | R | S | T | U | V | W |
|---|---|---|---|---|---|---|
| 0 | 0 | 0 | 1 | 0 | 0 | 1 |
| 1 | 0 | 1 | 1 | 1 | 1 | 0 |
| 2 | PARITY Q ||||||
| 3 | ||||||
| 4 | COLOR 0 ||||||
| 5 | ||||||
| 6 | ⋮ ||||||
| 17 | ||||||
| 18 | COLOR 7 ||||||
| 19 | ||||||
| 20 | PARITY P ||||||
| ⋮ | ||||||
| 23 | ||||||

Fig. 8

| SYMBOL | R | S | T | U | V | W |
|---|---|---|---|---|---|---|
| 0 | 0 | 0 | 1 | 0 | 0 | 1 |
| 1 | 0 | 0 | 0 | 1 | 1 | 0 |
| 2 | PARITY Q ||||||
| 3 | ||||||
| 4 | CHANNEL || COLOR 0 ||||
| 5 | CHANNEL || COLOR 1 ||||
| 6 | 0 | ROW |||||
| 7 | COLUMN ||||||
| 8 | FONT ||||||
| ⋮ | ||||||
| 19 | ||||||
| 20 | PARITY P ||||||
| ⋮ | ||||||
| 23 | ||||||

| Fig.11A |
|---------|
| Fig.11B |
| Fig.11C |

Fig. 17

| MODE | ITEM | |
|---|---|---|
| 0 0 0 | 0 0 0 | ZERO MODE |
| 0 0 1 | 0 0 0 | LINE-GRAPHICS MODE |
| 0 0 1 | 0 0 1 | TV-GRAPHICS MODE |
| 0 0 1 | 0 1 0 | EXTENDED LINE-GRAPHICS MODE |
| 0 0 1 | 0 1 1 | EXTENDED TV-GRAPHICS MODE |
| 1 1 1 | 0 0 0 | USER'S MODE |

Fig. 18

| SYMBOL | R | S | T | U | V | W |
|---|---|---|---|---|---|---|
| 0 | 0 | 0 | 1 | 0 | 1 | 0 |
| 1 | 0 | 1 | 1 | 1 | 0 | 1 |
| 2 | PARITY Q ||||||
| 3 | ||||||
| 4 | 0 | 0 | $b_3$ | $b_2$ | $b_1$ | $b_0$ |
| 5 | 0 | 0 | $b_7$ | $b_6$ | $b_5$ | $b_4$ |
| 6 | 0 | 0 | 0 | 0 | 0 | 0 |
| ⋮ | ⋮ ||||||
| 19 | 0 | 0 | 0 | 0 | 0 | 0 |
| 20–23 | PARITY P ||||||

Fig. 19

| SYMBOL | R | S | T | U | V | W |
|---|---|---|---|---|---|---|
| 0 | 0 | 0 | 1 | 0 | 1 | 0 |
| 1 | 0 | 0 | 0 | 1 | 0 | 0 |
| 2 | PARITY Q ||||||
| 3 | ||||||
| 4 | 0 | 0 | $T_0$ | COLOR 0 |||
| 5 | 0 | 0 | $T_1$ | COLOR 1 |||
| 6 | 0 | 0 | 0 | 0 | ROW ||
| 7 | COLUMN ||||||
| 8–19 | FONT ||||||
| 20–23 | PARITY P ||||||

Fig. 20

| | R | S | T | U | V | W |
|---|---|---|---|---|---|---|
| SYMBOL 0 | 0 | 0 | 1 | 0 | 1 | 1 |
| 1 | 0 | 1 | 1 | 1 | 0 | 0 |
| 2 | \multicolumn{6}{c}{PARITY Q} |
| 3 | | | | | | |
| 4 | 0 | 0 | $b_3$ | $b_2$ | $b_1$ | $b_0$ |
| 5 | 0 | 0 | $b_7$ | $b_6$ | $b_5$ | $b_4$ |
| 6 | 0 | 0 | $b_{11}$ | $b_{10}$ | $b_9$ | $b_8$ |
| 7 | 0 | 0 | $b_{15}$ | $b_{14}$ | $b_{13}$ | $b_{12}$ |
| 8 | 0 | 0 | 0 | 0 | 0 | 0 |
| ⋮ | | | | | | |
| 19 | 0 | 0 | 0 | 0 | 0 | 0 |
| 20 | \multicolumn{6}{c}{PARITY P} |
| ⋮ | | | | | | |
| 23 | | | | | | |

Fig. 21

| | R | S | T | U | V | W |
|---|---|---|---|---|---|---|
| SYMBOL 0 | 0 | 0 | 1 | 0 | 1 | 1 |
| 1 | 0 | 0 | 0 | 0 | 0 | 1 |
| 2 | \multicolumn{6}{c}{PARITY Q} |
| 3 | | | | | | |
| 4 | T | 0 | \multicolumn{4}{c}{COLOR} |
| 5 | 0 | 0 | \multicolumn{4}{c}{REPEAT} |
| 6 | 0 | 0 | 0 | 0 | 0 | 0 |
| ⋮ | | | | | | |
| 19 | 0 | 0 | 0 | 0 | 0 | 0 |
| 20 | \multicolumn{6}{c}{PARITY P} |
| ⋮ | | | | | | |
| 23 | | | | | | |

| SYMBOL | R | S | T | U | V | W |
|---|---|---|---|---|---|---|
| 0 | 0 | 0 | 1 | 0 | 1 | 0 |
| 1 | 1 | 0 | 0 | 1 | 0 | 0 |
| 2 | PARITY Q ||||||
| 3 | ||||||
| 4 | MIXING RATIO || POSITION ||||
| 5 | 0 | 0 | 0 | 0 | 0 | 0 |
| ⋮ | ||||||
| 19 | 0 | 0 | 0 | 0 | 0 | 0 |
| 20 | PARITY P ||||||
| ⋮ | ||||||
| 23 | ||||||

| SYMBOL | R | S | T | U | V | W |
|---|---|---|---|---|---|---|
| 0 | 0 | 0 | 1 | 0 | 1 | 1 |
| 1 | 1 | 1 | 0 | 1 | 1 | 0 |
| 2 | PARITY Q ||||||
| 3 | ||||||
| 4 |  |  | 0 | 0 | 0 | 0 |
| 5 | 0 | 0 | 0 | 0 | 0 | 0 |
| 6 | 0 | Sx |||||
| 7 | Sy ||||||
| 8 | 0 | ex |||||
| 9 | ey ||||||
| 10 | 0 | 0 | 0 | 0 | 0 | 0 |
| ⋮ | ||||||
| 19 | 0 | 0 | 0 | 0 | 0 | 0 |
| 20 | PARITY P ||||||
| ⋮ | ||||||
| 23 | ||||||

| SYMBOL | R | S | T | U | V | W |
|---|---|---|---|---|---|---|
| 0 | 0 | 0 | 1 | 0 | 1 | 1 |
| 1 | 0 | 0 | 0 | 0 | 0 | 1 |
| 2 | PARITY Q ||||||
| 3 | ||||||
| 4 | MIXING RATIO || COLOR ||||
| 5 | 0 | 0 | REPEAT ||||
| 6 | 0 | 0 | 0 | 0 | 0 | 0 |
| ⋮ | ||||||
| 19 | 0 | 0 | 0 | 0 | 0 | 0 |
| 20 | PARITY P ||||||
| ⋮ | ||||||
| 23 | ||||||

| SYMBOL | R | S | T | U | V | W |
|---|---|---|---|---|---|---|
| 0 | 0 | 0 | 1 | 0 | 1 | 1 |
| 1 | 0 | 0 | 0 | 0 | 1 | 0 |
| 2 | PARITY Q ||||||
| 3 | ||||||
| 4 | MIXING RATIO || COLOR ||||
| 5 | 0 | 0 | 0 | 0 | 0 | 0 |
| ⋮ | ||||||
| 19 | 0 | 0 | 0 | 0 | 0 | 0 |
| 20 | PARITY P ||||||
| ⋮ | ||||||
| 23 | ||||||

| Fig. 28 | |
|---|---|
| Fig. 28A | Fig. 28B |
| | Fig. 28C |

| Fig. 29A | Fig. 29B |
| | Fig. 29C |

METHOD AND APPARATUS FOR RECORDING AND REPRODUCING PICTURE INFORMATION ENABLING THE MIXING OF IMAGES OF A VIDEO FORMAT SIGNAL AND GRAPHIC CODES RECORDED ON A SINGLE RECORDING MEDIUM

BACKGROUND OF THE INVENTION

1. Field of the Invention

The present invention relates to method and apparatus of recording and reproducing picture information on and from a recording medium such as a video disc, a digital audio disc, and so on.

2. Description of Background Information

A system is proposed in which picture information is recorded and reproduced in the form of the subcode on and from a digital audio disc having a diameter of 12 cm, generally called compact disc (abbreviated as CD hereinafter). The subcode is made up of eight subcode bits, and bit groups forming the subcode are divided into eight channels denoted by letters P, Q, R, S, T, U, V, and W respectively. In the method in which the picture information is recorded and reproduced in the form of the subcode, data corresponding to picture information is configured such that a symbol is formed by 6 bits of channels R through W from among the 8 bits forming the subcode, and 98 symbols are treated as one block, as illustrated in FIG. 1. Two symbols in the 98 symbols are used as a sync signal, and 24 symbols obtained by dividing the remaining 96 symbols by four are treated as a minimum unit of data, i.e. a "pack", which constitutes one instruction of the picture processing.

More specifically, the first symbol (referred to as symbol 0 hereinafter) of the 24 symbols shows one of several modes. A symbol 1 following this symbol 0 forms "instruction" which indicates the sort of the instruction. Symbols 2 and 3 following the symbol 1 constitute a parity Q which is an error correction code. Symbols 4 through 19 following the parity Q constitute a data field, and include information such as color information. Finally, symbols 20 through 23 following the data field constitute a parity P which is an error correction code for protecting the information in the "pack".

On the other hand, there are four modes, i.e. "zero mode", "line-graphics mode", "TV-graphics mode", and "user's mode". The "zero mode" is provided for a case where no operation is required for pictures on the display screen, that is, picture are to be maintained as they are, and all data in the "pack" are 0 for this mode.

The "line-graphics mode" is provided for such a case that a liquid crystal display is provided on the front face of the player, to display notes such as an explanation of a music selection. As shown in FIG. 2, a picture area elongated sideways is formed by pixels which are arranged in 288 columns and 24 rows. In other words, each row includes 288 pixels and each column includes 24 pixels. The term "pixel" means the minimum display element of a picture, and it is general that the picture processing is performed by using picture composing units designated as "fonts" each of which is made up of pixels divided into 6 columns and 12 rows.

The number of "fonts" which can be displayed in the "line-graphics mode" is 48 in the lateral direction, and 2 in the column direction, and this area is designated as "screen area". For providing the scroll function, a line of "fonts" is added to the upper and lower outer peripheries and the right and left peripheries of the "screen area", to form a picture area having 50 "fonts" in the row direction, and 4 "fonts" in the column direction. The subcode is formed so that the picture processing is performed by using a memory having addresses each corresponding to each pixel in this picture area. In addition, the area outside the "screen area" is designated as "border".

The "TV-graphics mode" is a mode for displaying images on the TV screen, and a picture is formed by pixels arranged in 192 rows and 288 columns as illustrated in FIG. 3. The number of "fonts" which can be displayed in the "TV-graphics mode" is 48 in the direction of row, and 16 in the direction of column. Also in this "TV-graphics mode", the subcode is formed so that the picture processing is performed by using a memory having addresses each of which corresponds to each pixel in a picture area having 50 "fonts" in the direction of row, and 18 "fonts" in the direction of column, made by adding a line of "fonts" to the upper and lower peripheries as well as the right and left outer peripheries of the "screen area".

As instructions for the picture processing, there are an instruction for painting out the whole picture area by one certain color, an instruction for drawing a picture in one "font" on the screen by using two different colors, an instruction for moving the whole picture upward, downward, or sideways, and so on.

Additionally, in the 8-bit groups forming the subcode, the Q bits forming the channel Q include time information corresponding to the track length to a certain position of each information data which is recorded from the beginning of the program area of CD, and form address time data which can be used as positional data representing the recording position. On the other hand, the P bits forming the channel P provide data including information relating to a pause between two music selections.

In the above-described system of recording and reproducing picture information as subcode, the time period necessary for displaying a picture of one "font" is about 3.3/1000 second, and about 2.5 seconds are necessary for displaying 48×16 characters.

This means it is not possible to record and reproduce pictures with motion. Furthermore, since the maximum number of colors which can be used in one picture is not more than 16, there has been a drawback that the reproduced pictures obtained by the system explained so far are monotonous, or without variety.

Therefore, it is conceivable to produce a picture having variety by mixing a signal corresponding to the video information recorded as the subcode with a separately generated video format signal. In that case, however, a sense of incompatibility would be generated from the reproduced picture obtained by the mixing operation if there is no correlation between the picture information recorded as the subcode and the separately generated video signal. Therefore, it becomes necessary, for example, to adjust the timing of generation of the signal corresponding to the picture information recorded as the subcode and the video format signal by a manual operation. Thus, it has been difficult to obtain reproduced pictures with full of variety which do not generate the sense of incompatibility.

OBJECT AND SUMMARY OF THE INVENTION

The present invention is based on the recognition of the above described point, and an object of the present invention is to provide a recording and reproducing system by which reproduced pictures with full of variety and viewable without generating the sense of incompatibility are easily produced.

According to the present invention, a recording and reproducing system is characterized in that, in addition to a video format signal and a coded information signal, graphic codes including picture information are recorded on a recording medium by inserting the graphic code as a subcode of the coded information signal, and at the time of playback of the recording medium, a signal corresponding to the graphic codes is mixed with the video format signal.

BRIEF DESCRIPTION OF THE DRAWINGS

FIG. 1 is a diagram showing the recording format of the subcode;

FIG. 2 is a diagram showing the structure of picture in the "line-graphics mode";

FIG. 4 is a diagram showing the sort of recording modes in the method according to the present invention;

FIG. 5 is a diagram showing the construction of "load transparency control table";

FIG. 6 is a diagram showing the correspondency between the bit pattern of TCB and the mixing ratio;

FIG. 7 is a diagram showing "load color look-up table color 0 through color 7" instruction;

FIG. 8 is a diagram showing the construction of "write font foreground/background" instruction;

FIG. 17 is a diagram showing recording mode in another embodiment of the present invention;

FIG. 18 is a diagram showing the construction of "set TCW" instruction;

FIG. 19 is a diagram showing the construction of "write font" instruction;

FIG. 20 is a diagram showing the construction of "set TCW" instruction;

FIG. 21 is a diagram showing the construction of "pre-set memory" instruction;

FIG. 28 is a diagram showing the arrangement of FIGS. 28A through 28C

DETAILED DESCRIPTION OF PREFERRED EMBODIMENTS

Figure 3:
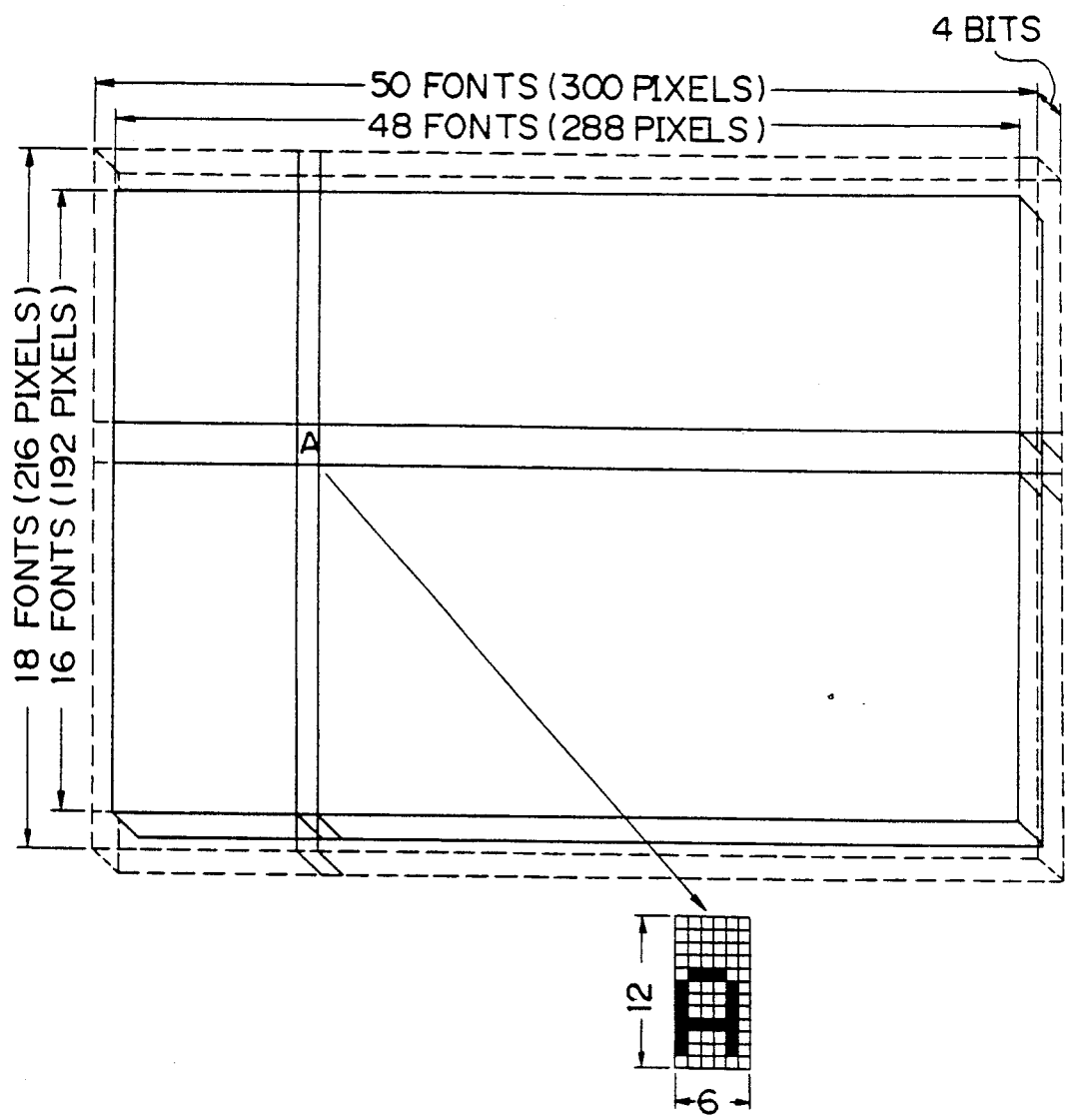
FIG. 3 is a diagram showing the structure of picture in the "TV-graphics mode"

An embodiment of the method according to the present invention will be explained with reference to FIGS. 4 through 28C of the accompanying drawings.

As shown in FIG. 4, a code to be inserted as the symbol 0 is set in order to designate an additional mode, that is, "graphic mode with motion picture" in addition to the "zero mode" the "line-graphics mode", the "TV-graphics mode" and the "user's mode" which are also used in conventional methods.

The structure of picture in the "graphics mode with motion picture" is identical with that in the "TV-graphics mode", and an instruction designated as "load transparency control table" is provided. This "load transparency control table" instruction is an instruction for designating the mode for each pixel in the picture information area. Three modes are designated by this instruction, and those are namely, "transparent mode", "mixing mode", and "non-transparent mode". In these three modes, different values are selected for the mixing ratio between a video format signal obtained by the subcode and a video format signal which is recorded by a multiplexing operation together with the coded information signal including the subcode.

The bits in the channels R through W of each of the symbols 4 through 8 and the channels R and S of the symbol 9 constitute a series of codes TCB-0 through TCB 15 which respectively designate one of the modes which will be described later for each of the group of pixels to which one of colors, which are registered as color number "0" through color number "15", is allotted. FIG. 6 shows the relationship between bit patterns of the codes TCB-0 through TCB-15 and the modes designating the mixing ratio, and the mixing ratio in each mode.

In addition, the sixteen colors indicated by the color number "0" through "15" are set by a "load CLUT color 0 through color 15 (load color look-up table color 0 through color 15)" instruction. The "load CLUT color 0 through color 15" instruction is an instruction having a structure illustrated in FIG. 7, and setting the contents of a color look-up table showing the color of pre-set color numbers or foreground/background color numbers. It is necessary to designate sixteen colors in total. However, since four bits are used respectively for each of RGB to indicate a color, two symbols are required for setting one color. Therefore, eight colors are set by one "pack" at most. With this circumstances, this instruction is divided into two instructions respectively designating eight colors of the first half, and eight colors of the second half.

The instruction code for the colors of the first half, i.e. the color 0 through the color 7, is determined to be "30", and the instruction code for the colors of the second half, i.e. the color 8 through color 15 are determined to be "31". The mixing of colors for each of the color number is as follows. Red color is represented by four bits of the channels R through U of even symbols allotted to the color number. Green color is represented by four bits, i.e. two bits of the channels V and W following the channels R through U of the even symbols, and two bits of the channels R and S of odd symbols. Blue color is represented by four bits of channels T through W following the channels R and S of the odd symbols. Therefore, $2^4 (=16)$ sorts of gray scales are available for each color, and preparation of $16^3 (=4096)$ colors is possible since three colors (RGB) are used. In addition, a gray scale "0000" corresponds to the darkest state, and a gray scale "1111" corresponds to the brightest state.

On the other hand, a "write font foreground/background" instruction is used in the "TV-graphics mode", which has such a structure as illustrated in FIG. 8. This is an instruction for writing font data of the symbols 8 through 19 in positions having a row address defined by the symbol 6 and a column address defined by the symbol 7. For the pixels whose font data is "0", a color of a color number determined by the "color 0" is designated as a background color. For the pixels whose font data is "1", a color of a color number defined by "color 1" is designated as a foreground color. At the same time, sub-picture channels can be designated by using four bits of the channels R and S of the symbols 4 and 5. By this feature, as many as sixteen picture channels can be designated. Sixteen sorts of picture are previously recorded on a disc for example, and a desired picture channel can be selected on the playing side at the time of playing by this scheme of designating the picture channel.

Figure 9:
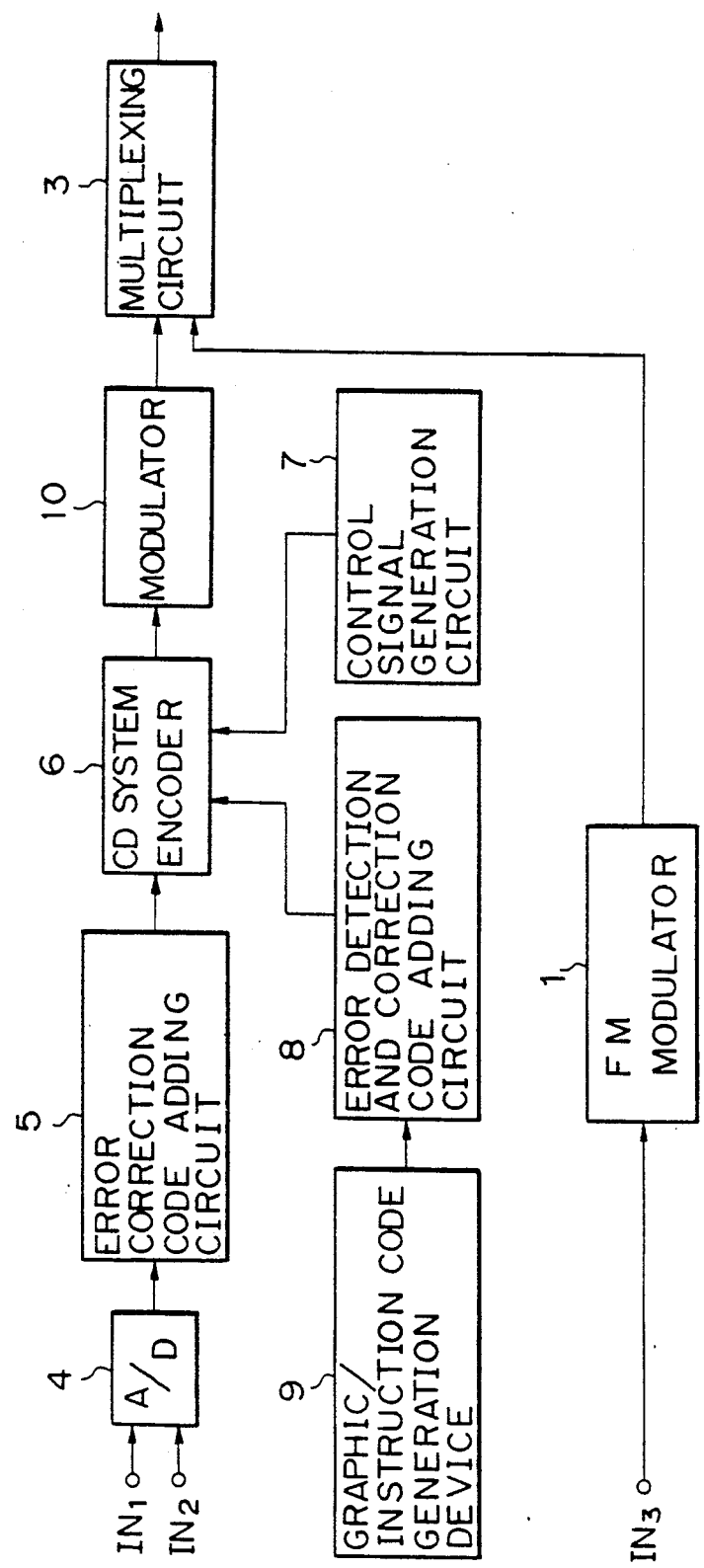
FIG. 9 is a block diagram showing an example of the construction of recording apparatus.

FIG. 9 shows an apparatus for recording the above explained codes on a recording disc by inserting the codes in the subcode.

In the arrangement shown in FIG. 9, two-channel audio signals and a video format signal outputted from a video tape recorder for example, are respectively supplied to input terminals $IN_1$, $IN_2$, and $IN_3$. The video format signal is supplied to an FM modulator 1. In the FM modulator 1, a carrier signal of a predetermined frequency is FM-modulated by the video format signal. An FM signal outputted by this FM modulator 1 is supplied to a multiplexing circuit 3. On the other hand, left and right-channel audio signals are supplied to an analog-to-digital converting circuit 4. The analog-to-digital converting circuit 4 is configured to perform the sampling of each of the left and right-channel audio signals at a sampling frequency of 44.1 kHz for example, to generate two digital data corresponding to two sampled values obtained by the sampling, and to output the digital data after treating them by time division multiplexing. The output data of this A/D converter 4 is supplied to a CD system encoder 6 through an error correction code adding circuit 5 which performs the interleave of the data, the error detection, and addition of codes for the error correction. To the CD system encoder 6, an output signal of the control signal generating circuit 7 and an output signal of the error detection and correction code adding circuit 8 are supplied. The control signal generating circuit 7 is configured to generate data such as a data indicating the time elapsed after the start of the supply of audio signals to the input terminals $IN_2$ and $IN_3$, and a data indicating a pause between music selections or a portion within one music selection of the audio signals.

On the other hand, output data of the graphic/instruction code generation device 9 is supplied to the error correction and correction code adding circuit 8. The graphic/instruction code generation device is configured to record a plurality of codes which are previously inputted by key operations for example, and to read-out and output desired codes. The error detection and correction code adding circuit 8 is configured to perform the interleave and error detection of the output data of the graphic/instruction code generation device 9 and the addition of the correction code.

The CD system encoder 6 is configured to form a recording signal by making the output of the control signal generation circuit 7 data of the channels Q and P, and making the output of the graphic code generating device through the error detection and correction code adding circuit 8 data of the channels R through W, and inserting those data into the digital data from the A/D converter 4. Output signal of this CD system encoder 6 is supplied to a modulator 10 and converted to an EFM (Eight to Fourteen Modulation) modulation signal. The output signal of this modulator 10 is supplied to the multiplexing circuit 3, and processed by a frequency multiplexing with the FM-modulated video format signal.

The output signal of the multiplexing circuit is supplied to an optical disc recorder of known arrangement (not shown) in which the strength of a light beam irradiated on the recording surface of a disc rotated at a constant linear velocity for example, is modulated by this signal. As a result, the graphic codes including picture information and the instruction codes are recorded on the recording disc as the subcode of the digital audio signal, in addition to the video format signal and the digital audio signal as the coded information signal.

Figure 10:
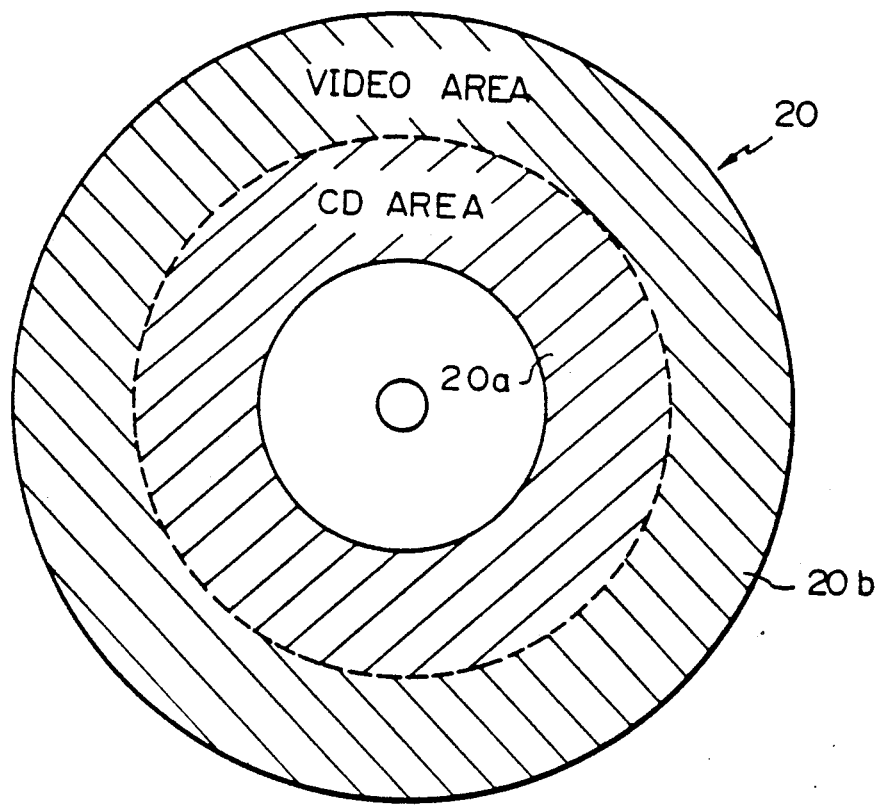
FIG. 10 is a diagram showing recording area of a composite disc.

FIG. 10 shows a composite disc 20 carrying a digital audio signal functioning as the coded information signal into which the subcode including picture information is inserted as explained above. As shown, the composite disc 20 has a first area 20a disposed in an inner peripheral area of the disc (this area being referred to hereinafter as the CD area) in which is recorded a digital audio signal with the subcode including picture information being inserted, and a second recording area 20b (this area being referred to hereinafter as the video area) containing an FM-modulated video format signal and a superimposed digital audio signal with the subcode including picture information being inserted, wherein the superimposition operation is performed by using a frequency multiplexing system. Since the video format signal contains higher frequency components than the PCM signal, it is necessary to rotate the disc at a higher speed of rotation during the recording of signals in the video area 20b, than during the recording of the signal in the CD area 20a. Therefore of course it is necessary, in the playing time, to reproduce the signal by rotating the disc at the higher speed during the playback of video area 20b, than during the playback of CD area 20a. The speed of disc rotation during the playback of CD area 20a is several hundred r.p.m., whereas during the video area playback the speed of rotation is two thousand plus several hundred r.p.m. for playback from the innermost periphery of that area, and is one thousand plus several hundred r.p.m. for playback from the outermost periphery of that area, so that the speed of rotation is extremely high during video area playback.

In the head portions of the CD area 20a and the video area 20b, there respectively are provided a lead-in area in which are recorded, as the subcode, index codes relating to the contents recorded in each area, such as first and second code groups formed correspondingly to each area by the repetition of index codes which respectively indicate start and end times of small portions which together constitute each area. In addition, the index codes of the audio lead-in area include information showing whether the disc itself is a composite disc or a disc of other type.

Figures 11, 11A:
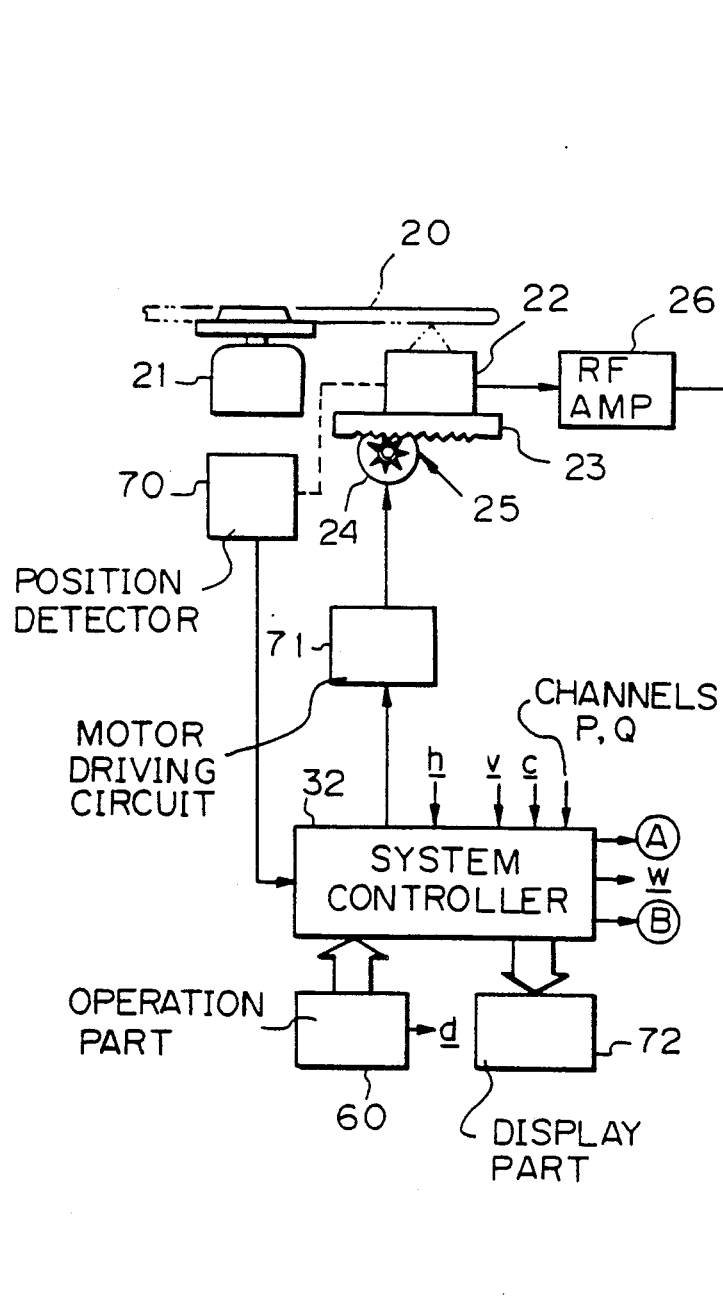
FIGS. 11A through 11C, when combined, are a block diagram showing an apparatus for reproducing picture information recorded on a disc in accordance with recording and playback method according to the present invention.
FIG. 11 is a diagram showing the arrangement of FIGS. 11A through 11C.
Figure 11B:
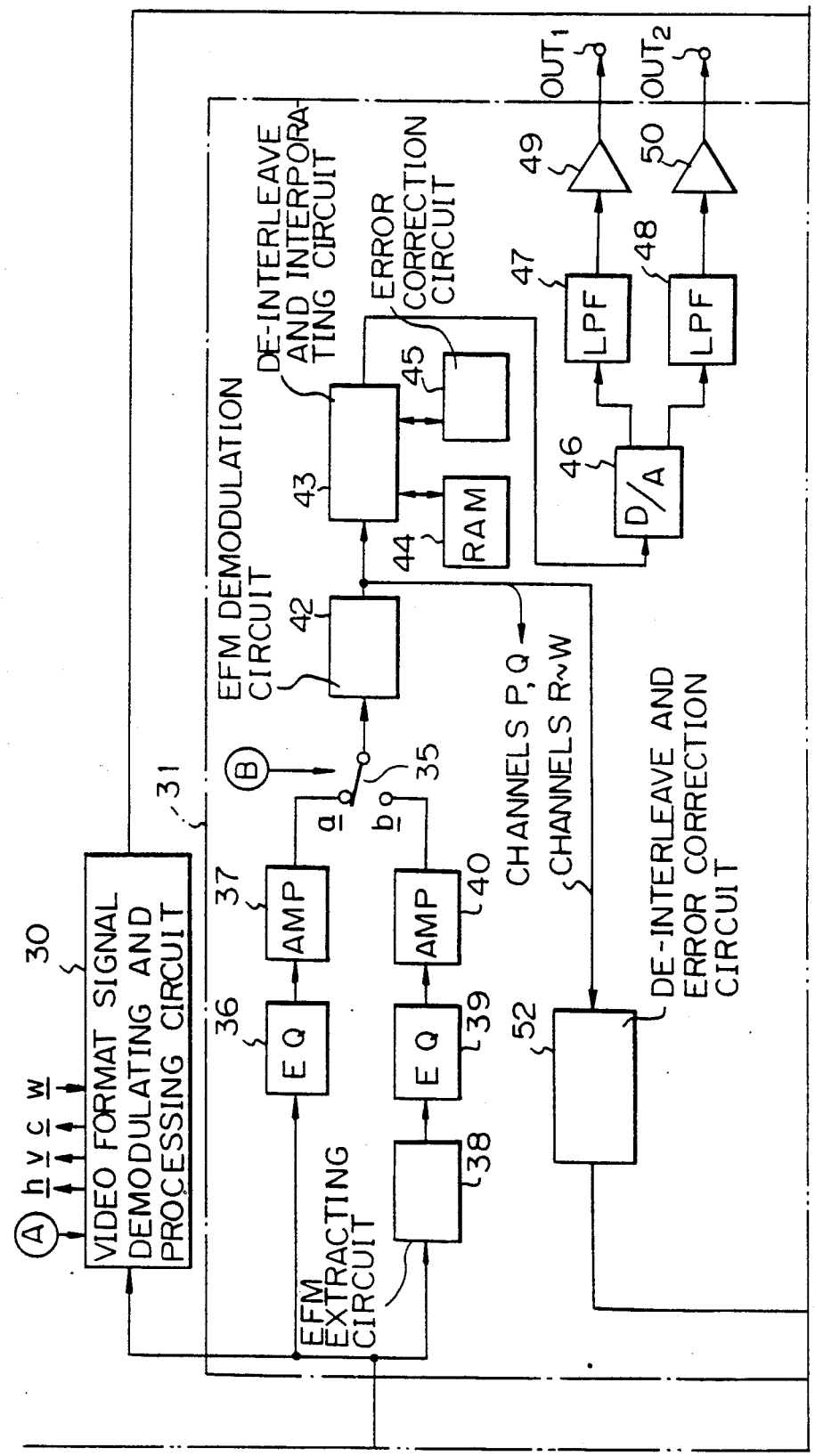
Figure 11C:
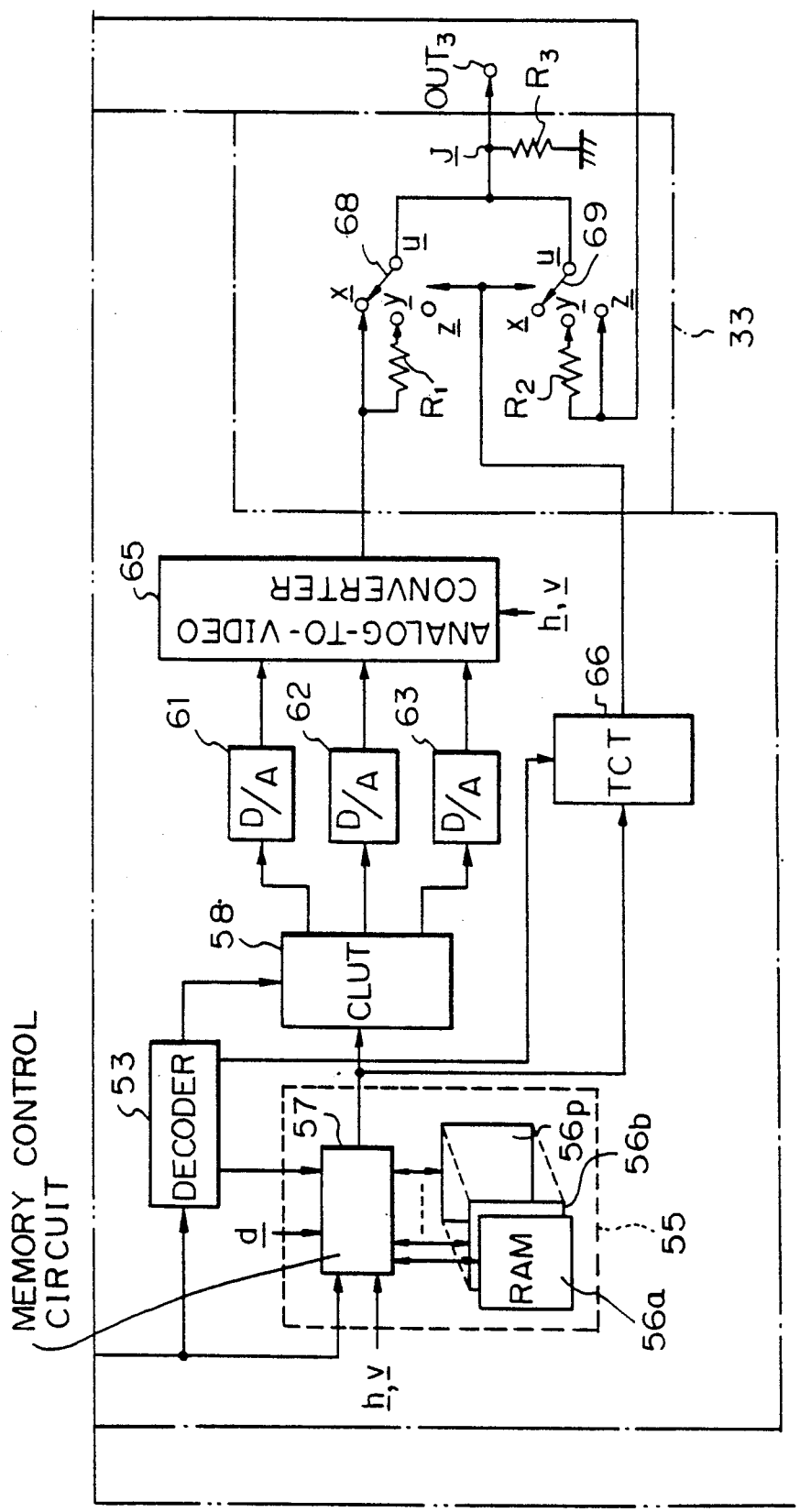

FIGS. 11A through 11C show a disc player for playing a composite disc which has been explained above. As illustrated in these figures, a disc 20 is rotated by a spindle motor 21, and information recorded thereon is read-out by means of a pickup 22. The pickup 22 incorporates therein an optical system including a laser diode, an objective lens, and photo detectors, a focus actuator for driving the objective lens in a direction of its optical axis with respect to the information recording surface of the disc 20, a tracking actuator for biasing the beam spot (information detecting point) issued from the pickup 22 with respect to the recording tracks in a direction of disc radius, and so on. The pickup 22 is mounted on a slider 23 which is linearly movable in the direction of disc radius by a drive of a transmission mechanism 25 which in turn has a slider motor 24 as a source of driving force, and made by a combination of rack and pinion gears. A read-out RF (radio frequency) signal outputted by the pickup 22 is supplied to a video format signal demodulating and processing circuit 30 and a coded information demodulating and processing circuit 31 through an RF amplifier 26.

The video format signal demodulating and processing circuit 30 includes a demodulation circuit which for example demodulates the RF signal and converts it to a video format signal and a memory which stores the video format signal after digitizing it, and configured to selectively output one of the video format signal outputted by the demodulation circuit and the video format signal read-out from the memory in accordance with a changeover command from a system controller 32. The video format signal outputted by the video format signal demodulating and processing circuit 30 is supplied to a video switch 33. In addition, the video format signal demodulating and processing circuit 30 is further provided with a separating circuit which separately extracts a horizontal sync signal h, a vertical sync signal v, and control data c from the demodulated video format signal, and the separated horizontal and vertical sync signals h and v, and the control data c are supplied to each part such as the system controller 32.

On the other hand, the coded information demodulating and processing circuit 31 is provided with a selector switch 35 which changes its switch position in accordance with the area to be played (the CD area or the video area) during the playing of a composite disc. The selector switch 35 is operated to a position a during the playing of the CD area, and to a position b during the playing of the video area, and the changeover is performed in response to a changeover command issued from the system controller 32. In the case of the composite disc, the speed of disc rotation changes extremely between the CD area and the video area, and the PCM audio signal is for example an EFM (Eight to Fourteen Modulation) signal. For the video area, the EFM signal will adversely affect on the low frequency component of the video signal treated by the FM modulation process if the digital signal is directly superimposed on the FM video signal at the time of recording. Therefore, the digital signal, i.e. the EFM signal is recorded at a level which is lower than the video carrier level by several tens of dB, although the degree of modulation is almost the same for the EFM and video signals. Thus the frequency characteristic and amplitude of a playback EFM signal will both be different, for the cases of CD area playback and video area playback respectively. However, a common demodulating system is used for the CD area playback and the video area playback. This is made possible by switching signal processing systems for the playback EFM signals of the CD area and the video area respectively.

Specifically, during playback of the CD area, the playback RF signal is an EFM signal, which is subjected to frequency characteristic compensation by an equalizer circuit 36 having a predetermined equalizing characteristic, and is amplified at a predetermined amplification factor by an amplifier 37. During the playing of the video area, on the other hand, the playback RF signal is an FM video signal which is combined with an EFM signal. The EFM signal is extracted by an EFM signal extracting circuit 38 which is made up of an LPF and so on, then is subjected to frequency characteristic compensation by an equalizer circuit 39, which has a different equalization characteristic from the equalizer circuit 36, to be then amplified by an amplifier 40, which has a higher gain than that of the amplifier 37. In this way, an EFM signal is derived whose frequency characteristic and amplitude are almost the same as the EFM signal obtained during CD area playback.

During playback of a CD disc, the selector switch 35 is held in position a.

The playback EFM signal selected by the selector switch 35 is supplied to an EFM demodulation circuit 42 which performs the demodulation process, to obtain a PCM data that is digital data including audio information of left and right channels which is for example time-division multiplexed, and the subcode. The digital data including audio information outputted by this EFM demodulation circuit 42 is supplied to a de-interleave and interpolating circuit 43. The de-interleave and interpolating circuit 43 is configured to change back, in cooperation with the RAM 44, the order of the digital data which was rearranged by the interleave operation during the recording, in turn send it to an error correction circuit 45, and to effect the interpolation of erroneous data in the output data of the error correction circuit 45 by the average value interpolation method for example, when a correction inability signal is outputted. The error correction circuit 45 is configured to perform the error correction operation by using the CIRC (Cross Interleave Reed Solomon Code), and supply the digital data to the de-interleave and interpolating circuit 43, or supply the digital data to the de-interleave and interpolating circuit 43 together with the correction inability signal when the error correction is not possible.

The output data of the de-interleave and interpolating circuit 43 is supplied to a D/A (Digital to Analog) converting circuit 46. The D/A converting circuit 46 includes a de-multiplexer which separates from each other the digital data of left and right-channel audio information combined by the time division multiplexing, and left and right-channel audio signals are reproduced. After their unnecessary components are removed at LPFs (Low Pass Filters) 47 and 48, the reproduced left and right-channel audio signals are supplied to audio output terminals $OUT_1$ and $OUT_2$ through amplifiers 49 and 50.

On the other hand, in the subcode outputted by the EFM demodulating circuit 42, two bits of the channels P and Q are supplied to the system controller 32, and six bits of the channels R through W are supplied to a de-interleave and error correction circuit 52 in which the de-interleave of the six bits of the channels R through W and the error correction using the parity Q and P are performed. Output data of the de-interleave and error correction circuit 52 is supplied to a mode/instruction decoder 53. The mode/instruction decoder 53 is configured to decode the mode represented by the three bits of the channels R through T of the symbol 0 of each pack, the mode designated by the item represented by the three bits of the channels U through W of the symbol 0 of each pack, and the instruction represented by the six bits of the channels R through W of the symbol 1 of each pack, and to supply to each part signals respectively indicative of the modes and the instruction.

Furthermore, the output data of the de-interleave and error correction circuit 52 is supplied to a picture memory device 55. The picture memory device 55 includes sixteen RAMs 56a through 56p having addresses respectively corresponding to all pixels on a picture having 50 "fonts" by 18 "fonts" in the row and column directions, and four bits of data can be stored in each address, and a memory control circuit 57 for sensing data indicating the color number of each pixel of each picture channels in the output data of the de-interleave and error correction circuit 52 by using the kind of the modes and the instruction indicated by the output of the mode/instruction decoder 53 and writing them in the corresponding addresses of the RAMs 56a through 56p, and for reading out sequentially in a predetermined order one memory content of the RAMs 56a through 56p corresponding to the picture channel designated by a data d by the key operation in an operation part 60 in accordance with horizontal and vertical sync signals h and v.

The data outputted by the picture memory device 55 is supplied to a color look-up table 58 (this table being referred to hereinafter as the CLUT). The CLUT 58 is configured to detect the "load CLUT color 0 through color 7" instruction and the "load CLUT color 8 through color 15" instruction from the output data of the de-interleave and error correction circuit 52 in accordance with the kind of the modes and the instruction indicated by the output signal of the mode/instruction decoder 53, and hold the color data corresponding to each color number, and configured to select and output color data of the color number designated by the data read-out from the picture memory 55.

The output data of this CLUT 58 is made up of three data respectively representing the level of one of the R, G, B color signals by using four bits. The three data outputted by the CLUT 58 and indicating the levels of the R, G, B color signals are supplied to D/A converting circuit 61, 62, and 63, and converted to analog signals. Output signals of these D/A converting circuits 61 through 63 are supplied to an analog-to-video converting circuit 65. The analog-to-video converting circuit 65 is configured, for example, to form a video signal of the NTSC system by the steps of obtaining a luminance signal and two color difference signals by the output signals of the D/A converting circuits 61 through 63, generating a color carrier signal by adding signals obtained by the parallel modulation of two color subcarrier signal having a phase difference of 90° by means of the two color difference signals, and combining the color carrier signal and the luminance signal by the summation, and adding sync signals thereto. By this analog-to-video converting circuit 65, the output signals of the D/A converting circuits 61 through 63 are converted to a video signal and transmitted subsequently.

In addition, the output data of the de-interleave and the error correction circuit 52 are also supplied to a transparency control table 66 (this table will be referred to hereinafter as the TCT hereinafter). The TCT 66 is configured to detect a "load TCT" instruction in the output data of the de-interleave and error correction circuit 52 in accordance with the kind of the modes and instruction indicated by the output signal of the mode/instruction decoder 53, hold transparency control bits TCB-0 through TCB-15, and select one of the TCB-0 through TCB-15 being held, corresponding to a color number indicated by the data read-out from the picture memory device 55 and in turn output it.

The output signal of the TCT 66 is supplied to a video switch 33 as a control signal. In addition to the output signal of the TCT 66, the video format signal obtained from the subcode and outputted by the analog-to-video converting circuit 65, and the video format signal outputted by the video format signal demodulating and processing circuit 30 are supplied to the video switch 33.

In the video switch 33, the video format signal obtained from the subcode is supplied to a stationary contact x of the changeover switch 68, and also supplied to its stationary contact y through a resistor $R_1$. No connection is made to a stationary contact z of the changeover switch 68. The changeover switch 68 is configured to selectively output one of the signals supplied to its stationary contacts x, y, z by moving its movable contact u to be in contact with one of the stationary contacts x, y, z in accordance with a control signal issued from the TCT 66. The video format signal outputted from the video format signal demodulating and processing circuit 30 is directly supplied to a stationary contact z of a changeover switch 69 and also supplied to its stationary contact y through a resistor $R_2$. No connection is made to a stationary contact x of the changeover switch 69. The changeover switch 69, like the changeover switch 68, is configured to move its movable contact u to be in contact with one of its stationary contacts x, y, z in accordance with the control signal. The movable contacts u, u of the changeover switches 68 and 69 are mutually connected. A resistor $R_3$ is connected between a common junction J of the movable contacts u, u and ground. A mixed signal of the video format signal obtained from the subcode and the video format signal outputted from the video format signal demodulating and processing circuit 30 is derived at the common junction J. When the movable contacts u, u of the changeover switches 68 and 69 are in contact with the stationary contacts x, x respectively, the mixing ratio of the video format signal obtained from the subcode becomes 100%, and the mixing ratio is reduced to 0% when the movable contacts u, u are in contact with the stationary contacts z, z. When, on the other hand, the movable contacts u, u are in contact with the stationary contacts y, y, the mixing ratio is equal to M which is determined by the resistors $R_1$ and $R_2$, and the resistance of the resistors $R_1$ and $R_2$ are selected so that M has a value between 20% and 80%. The signal derived at the common junction J is supplied to a video output terminal $OUT_3$.

A position detector 70 is provided in the vicinity of the path of the movement of pickup 22 along the radial direction of disc, and serves to detect when the beam spot emitted from the pickup 22 has reached a position corresponding to the vicinity of the boundary between the CD are and the video area of a composite disc, to produce a detection signal. By the generation of this detection signal, a state that the pickup 22 has reached to the video area can be detected. The position detector 70 can be of a known structure including for example an optical sensor. The detection signal outputted by the position detector 70 is supplied to the system controller 32.

The system controller 32 comprises a microcomputer which consists of a processor, a ROM (read only memory), a RAM and so on. The system controller 32 is supplied with various signals and information such as the horizontal sync signal h, the vertical sync signal v, and the control data c, the P-channel and Q-channel bits in the subcode outputted from the EFM demodulation circuit 42, disc designation information from the control part 60 indicating whether the disc to be played is a compact disc or a composite disc, and mode designation information from the operation part 60, indicating whether the reproducing area is only the CD area or the video area, or both CD and video areas in the case of the playback of a composite disc.

In this system controller 32, the processor executes processing of the signals inputted in accordance with programs previously stored in the ROM, and performs the control operation of each part of the video format signal demodulating and processing circuit 30, the selector switch 35, a drive circuit (not shown) for driving the spindle motor 21, a motor drive circuit 71 for driving the slider motor, and the display part 72.

Figure 12:
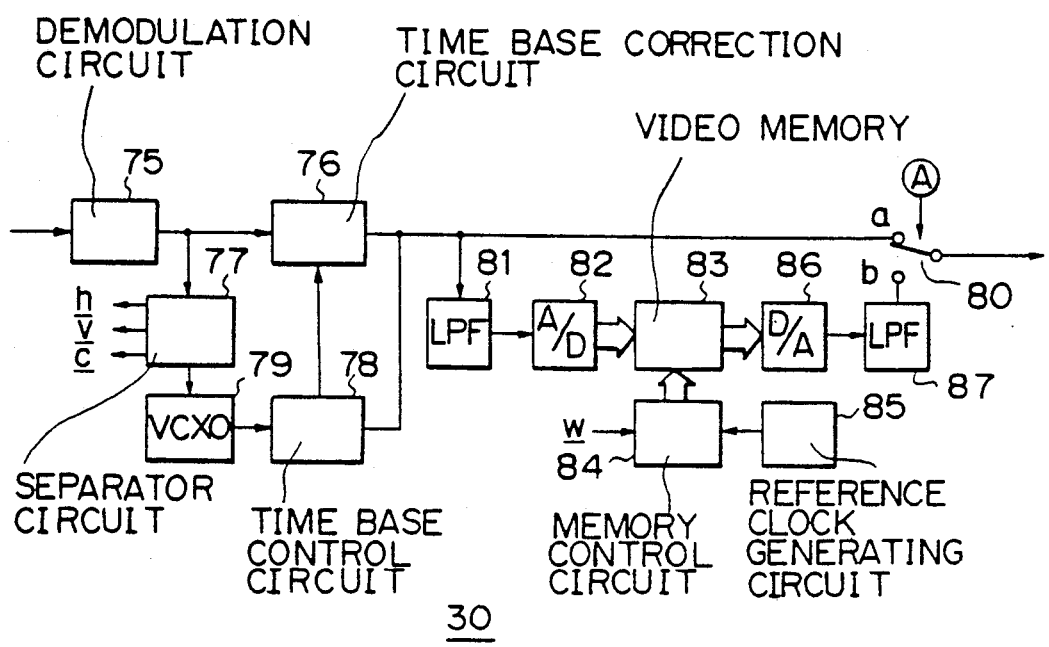
FIG. 12 is a block diagram showing a specific configuration of video format signal processing circuit 30 in the apparatus shown in FIGS. 11A through 11C.

FIG. 12 is a block diagram showing a specific circuit construction of the video format signal demodulating and processing circuit 30. As shown, the RF signal from the RF amplifier 26 is demodulated at a demodulation circuit 75, then supplied to a time base correction circuit 76 and to a separator circuit 77. In the separator circuit 77, the horizontal sync signal h, the vertical sync signal v and the control data c which are contained in the video format signal are extracted. The time base correction circuit 76 consists of, for example, a variable delay element of e.g. CCD (charge coupled device) and configured to vary the delay amount of that element in accordance with a control signal from a time base control circuit 78. The time base control circuit 78 is configured to output as the control signal a signal corresponding to a phase difference between an oscillation signal and its divided signal of a crystal oscillator (VCO) 79 which oscillates, for example, in synchronism with the horizontal sync signal h extracted at the separator circuit 77, and the horizontal sync signal and the color burst signal of the video signal transmitted through the time base correction circuit 76. For more specific configuration, reference is directed for example Japanese patent application laid-open number P56-102182.

The video signal having been processed by the time base correction operation is used as one input of a selector switch 80, and also supplied to an A/D converter 82 through an LPF (Low Pass Filter) 81. In the A/D converter 82, the sampling of the video signal is performed at intervals of a predetermined period, and the thus obtained sampled values are in turn converted to digital data. The output data of the A/D converter 82 is supplied to a video memory 83 consisting of a RAM (random access memory) and so on. A memory having a capacity for storing video information of at least one field long is used as the video memory 83. Address and mode controls of this video memory 83 are performed by a memory control circuit 84. The memory control circuit 84 is configured to perform control operations for sequentially read-out data written in each address of the video memory 83 in accordance with a clock from a reference clock generating circuit 85, and for rewriting the contents of each address of the video memory 83 in response to a write enable signal w which is outputted from the system controller 32. The data read-out from the video memory 83 is converted to an analog signal in a D/A (digital to analog) converter 86, and supplied through an LPF 87 as the other input to the selector switch 80. The selector switch 80 is normally held at a position a to selectively output the video format signal directly supplied from the time base correction circuit 76, and switched to a position b in response to a changeover command from the system controller 32, to selectively output the video format signal having been processed through the video memory 83.

Operations of the processor in the system controller 32 in the above configuration will be specifically explained with reference to the flowchart of FIG. 13.

Assume that a composite disc is set in a playback position. When a start command is issued in this state, the processor transmits a drive command to the motor driving circuit 71, so that the slider motor 24 is driven to move the pickup 22 to an innermost peripheral position (step S1). If it is detected that the pickup 22 has reached the innermost peripheral position by means of a detector switch of any usual configuration (not shown), the processor executes a focusing operation of the pickup 22, and performs the read-in of index code information which is recorded in an audio lead-in area at an innermost peripheral area of the disc (step S2). Subsequently, the processor judges whether or not the disc being set is a composite disc or not, on the basis of the read information (step S3). If it is judged that the disc being set is a compact disc, then the execution directly proceeds to a CD playback mode (step S4) and a playback operation is continuously performed unless any command for the programmed music selecting operation for example has been issued. Since the playback operation in the CD playback mode itself is well known, the explanation thereof is omitted here.

If it is judged in the step S3 that the disc being set is a composite disc, the processor immediately accelerates the spindle motor 21 to a maximum rated speed of rotation for the video area (step S5). At the same time, the processor moves the pickup 22 toward the outer periphery of disc at a high speed by driving the slider motor 24 at a high speed (step S6). After these operations, when it is detected that the pickup 22 has reached to the video area by the detection signal from the position detector 70 (step S7), the processor starts the playback operation of the video area (step S8). During video area playback, the processor performs the control operation for writing the video information of at least one field (or one frame) long obtained from the disc in the video memory 83. This video information to be written may be, for example, first information in the video area, or designated by an address designation through the key operation of the operation part 60.

If it is detected that the playback of the video area has been completed, in step S9, then the processor decelerates the spindle motor 21 to the maximum rated speed of rotation for the CD area (step S10). At the same time, the processor drives the slider motor 24 at a high speed, to move the pickup 22 to the innermost peripheral position of the disc at a high speed (step S11). If it is detected (step S12) that the pickup 22 has reached the innermost peripheral position by the detection output signal of the above mentioned detector switch (not illustrated), the processor starts playback operation of the CD area (step S13). Concurrently to this, the selector switch 80 in the video format signal demodulating and processing circuit 30 is changed over by the processor to the position b thereby selecting and outputting the video information which was written in the video memory 83 during video area playback. Thus, playback of a still picture is performed during CD area playback. When the completion of the CD area playback is detected by reading the information of audio lead-out (step S14), the processor initiates the driving of the slider motor 24 to move the pickup 22 to its home position (step S15) unless any operational command is present. Furthermore, a loading mechanism (not shown in the drawings) performs disc ejection (step S16), to complete the playback operating sequence.

Figure 13:
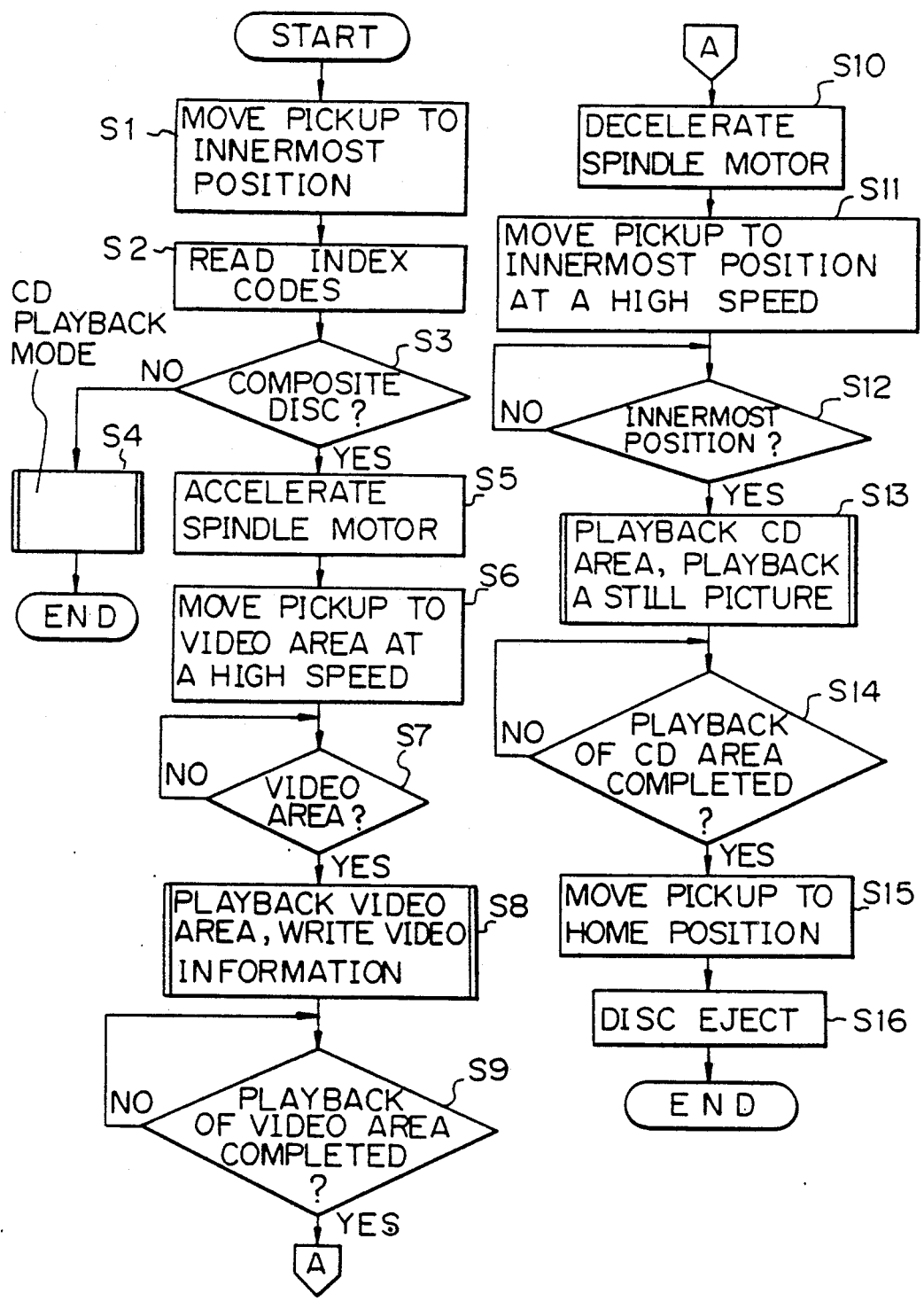
FIGS. 13 and 14 are flowcharts showing the operation of processor in system controller 32 of the apparatus shown in FIGS. 11A through 11C.
Figure 14:
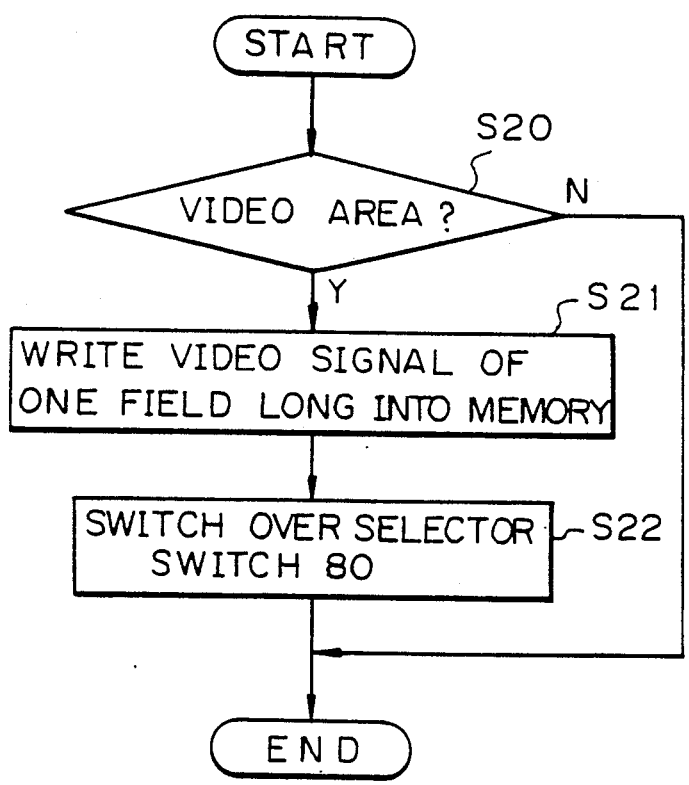

If a still picture playback command is issued from the operation part 60 during the execution of the routine illustrated in the flowchart of FIG. 13 or the execution of the main routine, the processor proceeds to step S20, to detect whether or not the video area is being played, as illustrated in FIG. 14. If it is detected in step S20 that the video area is not being played, the processor restarts the operation which was being executed immediately before the shifting to the step S20. If, on the other hand, it is detected in step S20 that the video area is being played, the processor transmits the write enable signal w for one field (or one frame) period in accordance with the vertical sync signal v, so that the video information of one field (one frame) long is written in the video memory 83 (step S21). Subsequently, the processor turns over the selector switch 80 to the contact b (step S22), and restarts the execution of the routine which was being executed immediately before the shift to the step S20.

In the operating sequence described above, playback of the information recorded in the CD area of the composite disc is performed in steps S10 through S14 after the playback of information recorded in the video area in steps S1 through S9. When the still picture playback command is generated during the playback of video area, the video information of one field (or one frame) long is written in the video memory 83 through the operation of the steps S20 through S22, and at the same time, the video signal read-out from the video memory 83 is selectively outputted from the selector switch 80. The playback of a still picture is performed in this way.

On the other hand, even if the still picture playback command is not issued during the playback of video area, reproduction of still picture is also performed during the playback of CD area by the operation of the selector switch 80 which selectively outputs the video signal written in the video memory 83 during the playback of video area.

When the "load CLUT color 0 through color 7" instructions and the "load CLUT color 8 through color 15" instructions are decoded by the mode/instruction decoder 53 during video area playback, data of designated 16 colors among 4096 colors are held in the CLUT 58.

Subsequently, by the decoding of the "write font foreground/background" instruction etc., picture data of 16 channels are in turn stored in the RAM 56a through 56p in the picture memory device 55. When one of the picture data of 16 channels is designated by data corresponding to the key operation in the operation part 60, picture data of the designated channel is sequentially outputted from the picture memory device 55, and in turn supplied to the CLUT 58. By this operation, color data of a color number indicated by the picture data is then outputted from the CLUT 58. A video format signal based on this color data is outputted from the analog video converting circuit 65, and supplied to the video switch 33.

Figure 15:
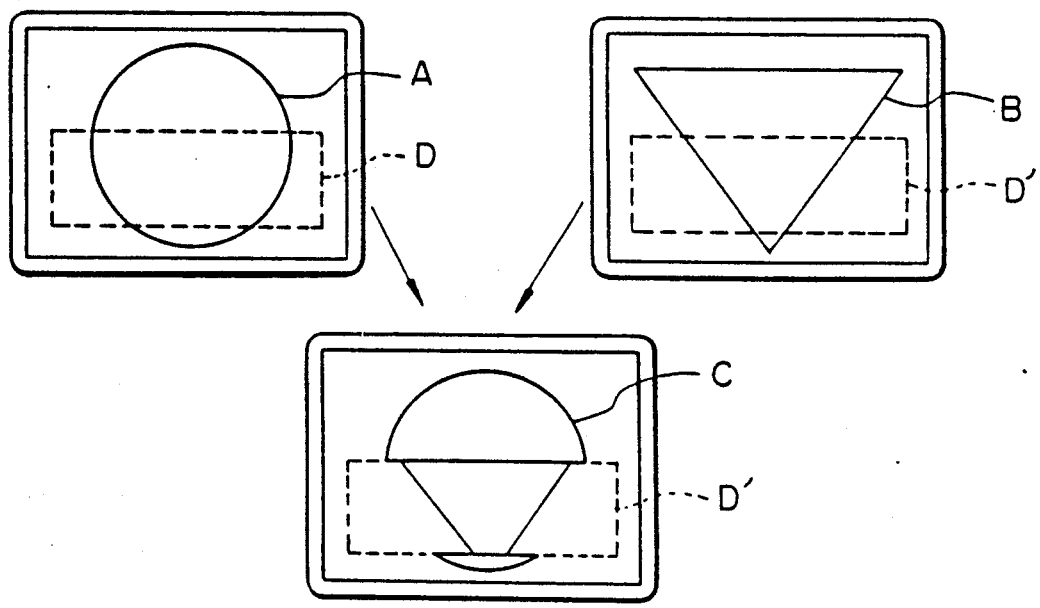
FIGS. 15 and 16A through 16C are diagrams showing pictures obtained by the apparatus shown in FIG. 11A through 11C.

If the "load TCT" instruction is decoded in this state, the transparency control bits TCB-0 through TCB-15 respectively corresponding to each color number are then held in the TCT 66. Among the TCB-0 through TCB-15 being held, one corresponding to the color number indicated by the data read-out from the picture memory device 55 is selectively outputted from the TCT 66, and the mixing ratio in the video switch 33 is designated by the output of the TCT 66. Thus, the mixing ratio between the video format signal outputted from the analog-to-video converting circuit 65 and the video format signal outputted from the video format signal demodulating and processing circuit 30 is controlled for each pixel. Consequently, a combination of pictures such as illustrated in FIG. 15 is made possible. Specifically, the mixing ratio is set to 100% for a portion corresponding to each pixel outside a region D of a picture A based on the video format signal outputted from the video format signal demodulating and processing circuit 30, and set to 0% for a portion corresponding to each pixel within the region D. On the other hand, the mixing ratio is set to 0% for a portion corresponding to each pixel outside a region D' of a picture B based on the video format signal outputted from the analog-to-video converting circuit 65, and set to 100% for a portion corresponding to each pixel within the region D' of the picture B. Then a picture C can be formed by combining the portion of the picture A outside the region D and the portion of the picture B within the region D'.

Figure 16A:
Figure 16B:
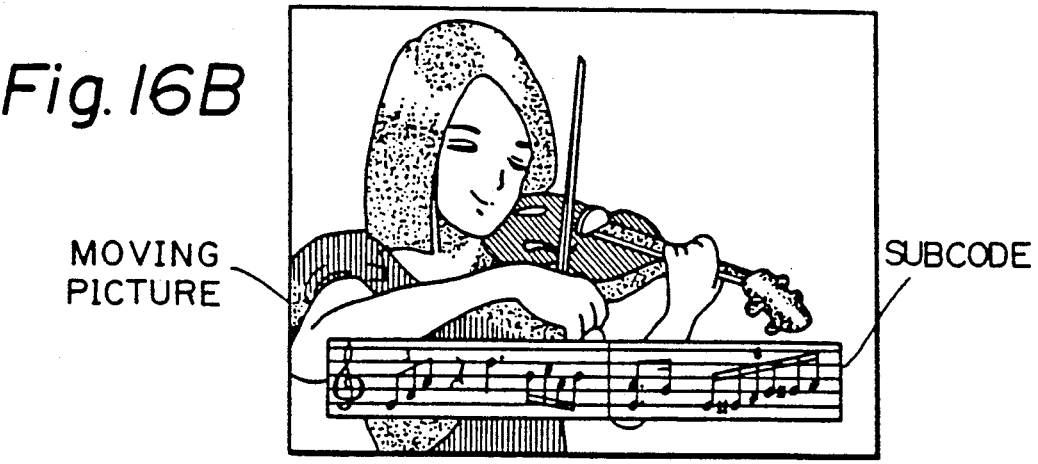
Figure 16C:
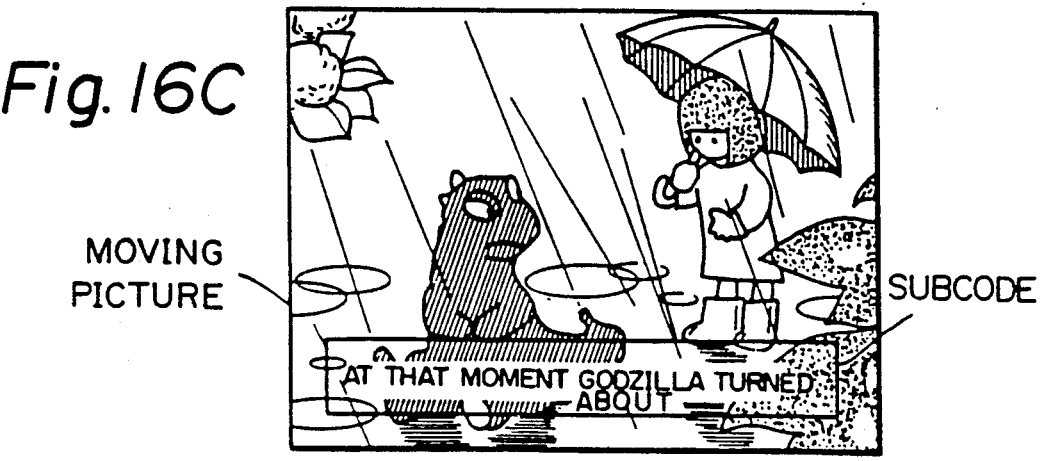

In this way, it is possible to compose a picture as illustrated in FIGS. 16A through 16C, in which a caption (a translation of a dialogue), a musical score, or an explanation of a scene, etc., obtained from the subcode is inserted into a moving picture obtained by the video format signal recorded in the video area.

As explained in the foregoing, it becomes possible to superimpose, on the motion picture produced from the video format signal recorded by the FM modulation, related pictures produced from the subcode, by processing in order the signal read-out from the disc 20. In this way a variety of reproduced pictures may be generated and viewable without creating a sense of incompatibility.

In the case where the picture produced from the subcode is inserted in the still picture from the video memory 83, the pictures produced from the subcode are played back together with the sound in the order of recording since the reading of the information recorded on the disc 20 is performed continuously. Therefore, a sense of incompatibility will not be apparent.

Moreover, by inserting data corresponding to characters of a plurality of languages in each of the picture channel, it becomes possible to record captions in a plurality of languages in a single disc, and to selectively display the caption in a desired language in accordance with a key operation in the operation part 60. Thus, there is an advantage that the preparation of a plurality of mother discs for different languages becomes unnecessary.

FIG. 17 is a diagram showing another embodiment of the present invention. In this embodiment, codes to be inserted as the symbol 0 are set for designating "extended line-graphics mode" and "extended TV-graphics mode" in addition to the four modes of "zero mode", "line-graphics mode", "TV-graphics mode", and "user's mode" in the conventional system.

The composition of picture in the "extended line-graphics mode" is the same as in the "line-graphics mode", and an instruction designated by a "set TCW" (set Transparent Control Word) having a structure shown in FIG. 18, and an instruction designated as "write font" shown in FIG. 19 are provided. The "set TCW" instruction is such an instruction in which each of the bits $b_0$ through $b_7$ of TCW represented by 8 bits of the channels T through W of the symbols 4 and 5 corresponds to each of the color numbers indicative of the eight colors in the "line-graphics mode", and which sets the mixing ratio to either one of 0% and 100% for each of the groups of pixels to which the corresponding color number is designated respectively, by using the value of the bits $b_0$ through $b_7$. On the other hand, the "write font" instruction, like the "write font" instruction in the "line-graphics mode", is an instruction for writing the font data in the designated locations in the picture memory, and at the same time, setting the mixing ratio to either one of 0% and 100% for each of groups of the pixels to which two color numbers represented respectively by 3 bits of the channels U through W of the symbols 4 and 5 are designated, by means of the value of each of the bits $T_0$, $T_1$ of the channel T of the symbols 4 and 5.

The composition of picture in the "extended TV-graphics mode" is the same as in the "TV-graphics mode", and this mode is provided with the instruction designated as "set TCW" illustrated in FIG. 20, and an instruction designated as "pre-set memory" illustrated in FIG. 21. The "set TCW" instruction in the "extended TV-graphics mode" is such an instruction in which bits $b_0$ through $b_{15}$ of the TCW represented by 16 bits of the channels T through W of the symbols 4 through 7 respectively correspond to the color numbers indicating the 16 colors in the "TV-graphics mode", and which sets the mixing ratio to either one of 0% and 100% for each of groups of pixels to which corresponding color number is designated, by using the value of each of the bits $b_0$ through $b_{15}$. The "pre-set instruction" instruction, on the other hand, is an instruction for setting the mixing ratio to either one of 0% and 100% for each of groups of pixels to which colors of the color numbers represented by the four bits of the channels T through W of the symbol 4 are designated respectively, by using the value of the bit T of the channel R of the symbol 4.

The picture information recorded as the subcode using the recording format explained so far can be processed by making the configuration of the TCT 66 in the apparatus shown in FIGS. 11A through 11C such that data representing the mixing ratio is held correspondingly to each color number by means of the "set TCW" instruction, the "write font" instruction, and the "pre-set memory" instruction.

In the embodiment described above, the number of bits of the instruction codes indicating the mixing ratio in each position of two-dimensional picture formed by the video format signal, is described as 1 or 2. However, the number of bits of this instruction codes can be set to be any value as long as the number does not exceed the bit number of the data field in one pack.

In the above, the present invention has been described by way of example in which graphic codes including picture information and instruction codes indicating the mixing ratio at each position of the two-dimensional picture formed by the video format signal are recorded on a recording medium by inserting those codes as the subcode of the coded information signal. Now, explanation will be made for a case in which the graphic code including the picture information and instruction codes for designating areas in the two-dimensional picture formed by the video format signal are recorded on a recording medium, by inserting those codes as the subcode of the coded information signal.

At first, as in the system illustrated in FIG. 17, codes to be inserted as the symbol 0 for designating "extended line-graphics mode" and "extended TV-graphics mode" in addition to the four modes of "zero mode", "line-graphics mode", "TV-graphics mode", and "user's mode" in the conventional system, are set.

Figures 22, 23, 24:
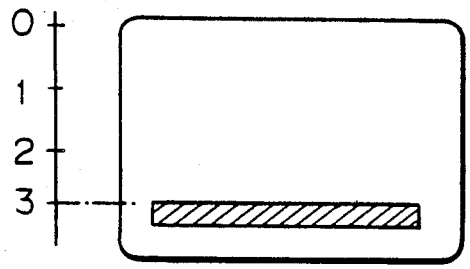
FIG. 22 is a diagram showing the structure of "set window" instruction in "extended line-graphics mode" in another embodiment according to another embodiment of the present invention.
FIG. 23 is a diagram showing the window in "extended line-graphics mode"
FIG. 24 is a diagram showing the structure of the "set window" instruction in the "extended TV-graphics mode"

The composition of picture in the "extended line-graphics mode" is the same as in the "line-graphics mode", and an instruction designated by a "set window" having a structure shown in FIG. 22 is provided. The "set window" instruction in the "line-graphics mode" is an instruction for determining an area of a rectangular form designated as "window" in a position on the picture designated by four bits of the channels T through W of the symbol 4. Since the "screen area" has only two rows of "fonts" in the "line-graphics mode", the whole area of the "screen area" is designated as the "window", and only the position of the "window" in the vertical direction on the screen of CRT display is determined, as illustrated by the oblique lines in FIG. 23. In addition, the mixing ratio is designated by two bits of the channels R and S of the symbol 4.

Figures 25, 26, 27:
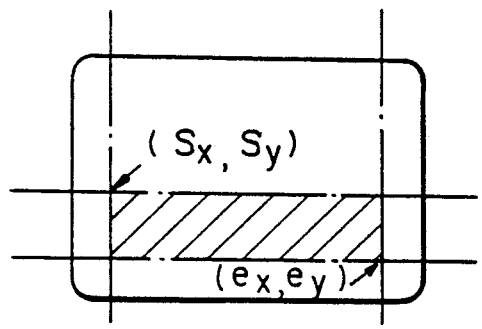
FIG. 25 is a diagram showing the structure of the "pre-set" instruction in the another embodiment.
FIG. 26 is a diagram showing the structure of "preset border" instruction.
FIG. 27 is a diagram showing the window in "extended TV-graphics mode"

The composition of picture in the "extended TV-graphics mode" is the same as in the "TV-graphics mode", and there are an instruction designated as "set-window" illustrated in FIG. 24, an instruction illustrated in FIG. 25 which is a modification of the "pre-set memory" instruction in the "TV-graphics mode", and an instruction illustrated in FIG. 26 which is a modification of an instruction designated as "pre-set border".

The "set window" instruction in the "extended TV-graphics mode" is an instruction in which an area of rectangular form designated as "window" is determined by the positions in the picture which are in turn defined by the symbols 6 and 7, and the symbols 8 and 9. The position of a point ($s_x$, $s_y$) corresponding to the left-top corner of the "window" in the vertical direction is indicated, in "row" number, by five bits of the channels S through W of the symbol 6, and the position of the point ($s_x$, $s_y$) in the horizontal direction is indicated, in "column" number, by six bits of the channels R through W of the symbol 7. On the other hand, the position of a point ($e_x$, $e_y$) corresponding to the right-bottom corner of the "window" in the vertical direction is indicated, in "row" number, by five bits of the channels S through W of the symbol 8, and the position of the point ($e_x$, $e_y$) in the horizontal direction is indicated, in "column" number, by six bits of the channels R through W of the symbol 9. By this "set window" instruction, a window such as illustrated by the oblique lines in FIG. 27 is determined in picture on the display screen.

In the area of "window" set by the above procedure, display is performed by using a signal obtained by mixing the video format signal obtained on the basis of the subcode, and a video format signal which is recorded with the digital signal including the subcode by a multiplex recording after being processed by an FM-modulation, for example. The mixing ratio between these video format signals is designated to be one of 0%, 30%, 70%, and 100% by using two bits of the channels R and S of the symbol 4.

The "pre-set memory" instruction in the "extended line-graphics mode" is, like the corresponding instruction in the "line-graphics mode", an instruction by which the color of all "fonts" in the memory is determined to be one color in 16 colors of the color numbers "0" through "16" which is designated by four bits of the channels T through W constituting the symbol 4, and the mixing ratio is determined to be a value designated by two bits of the channels R and S constituting the symbol 4.

The "pre-set border" instruction in the "extended TV-graphics mode" is, like the corresponding instruction in the "TV-graphics mode", an instruction by which the color of all "fonts" of the "border" portion in the memory is determined to be one color in 16 colors of the color numbers "0" through "15" which is designated by four bits of the channels T through W constituting the symbol 4, and the mixing ratio is determined to be a value designated by two bits of the channels R and S constituting the symbol 4.

Figure 28A:
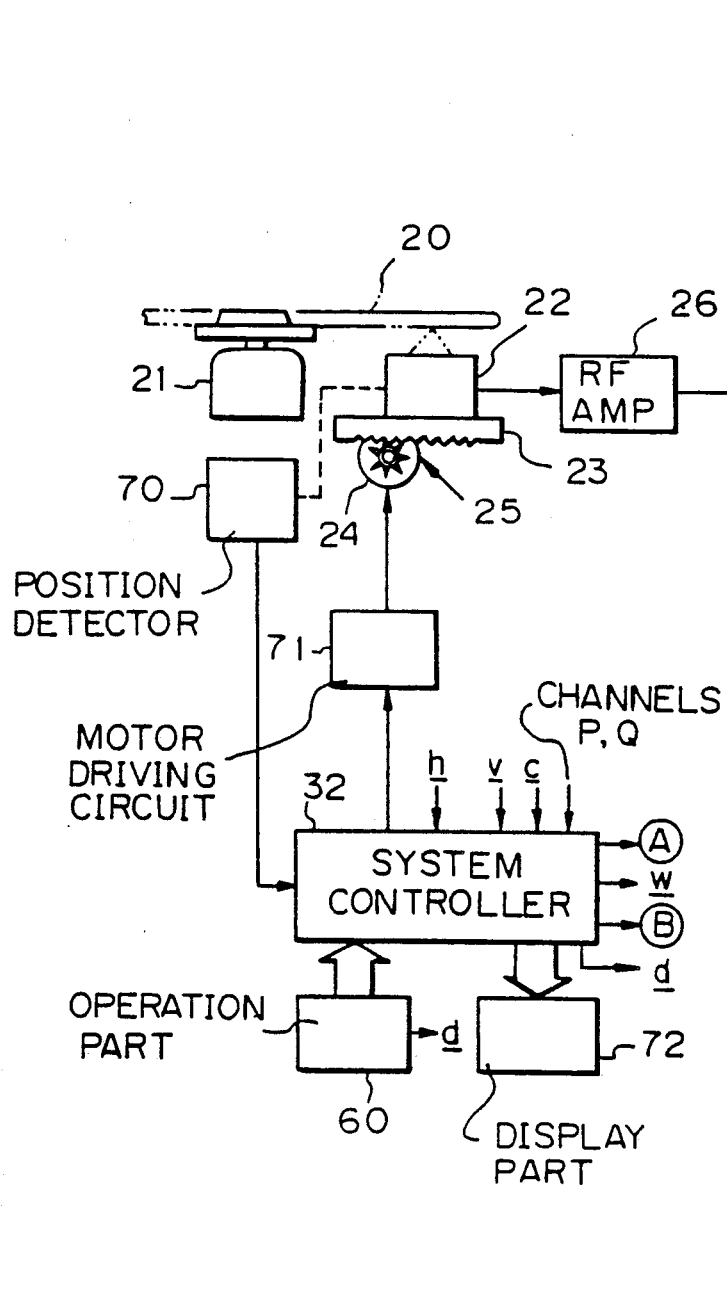
FIGS. 28A through 28C, when combined, are a block diagram showing another example of the apparatus for reproducing picture information according to the present invention.
Figure 28B:
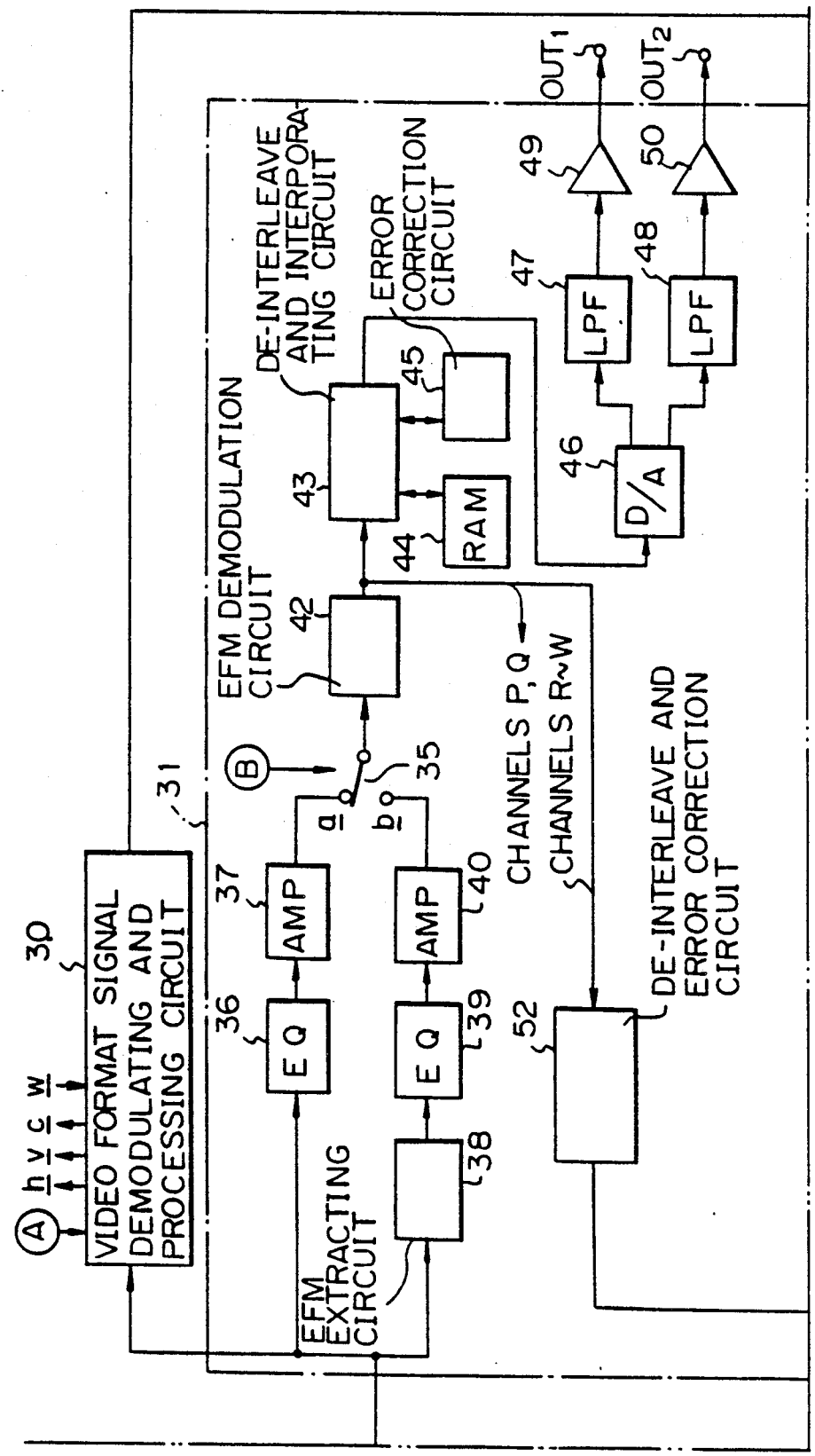
Figure 28C:
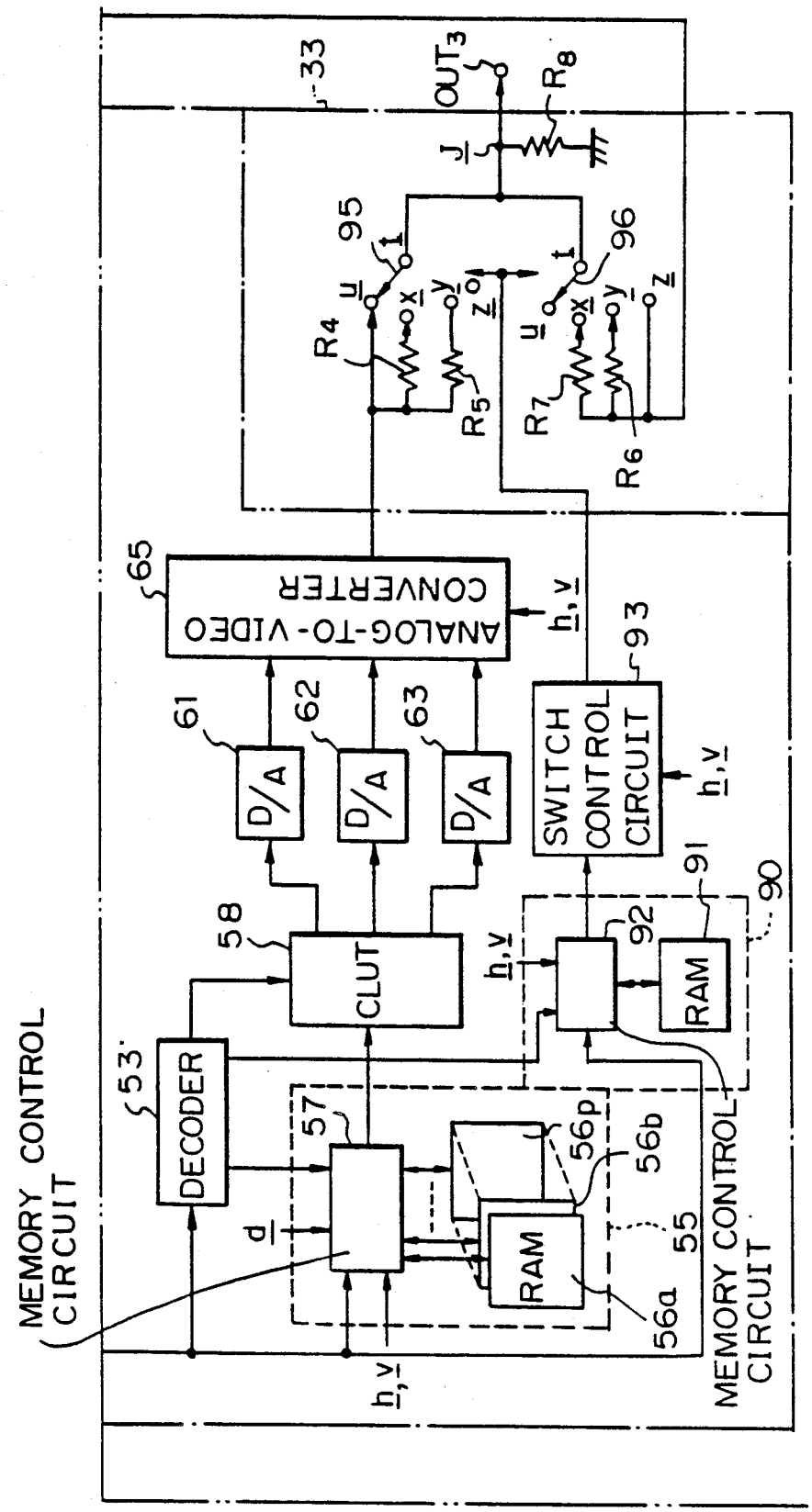

FIGS. 28A through 28C show a disc player for playing a composite disc as illustrated in FIG. 10 carrying a digital audio signal as the coded information signal into which the subcode including the picture information is inserted in the manner explained above. In these figures, the disc player is constructed generally the same as the disc player shown in FIGS. 11A through 11C, and the mutual connection is the same for various parts, i.e., the spindle motor 21 for driving the disc 20, pickup 22, slider 23, slider motor 24, transmission mechanism 25, RF amplifier 26, video format signal demodulating and processing circuit 30, coded information signal demodulating and processing circuit 31', system controller 32, video switch 33, operation part 60, position detector 70, motor driving circuit 71, and display part 72.

In the disc player system of this example, however, the coded information signal demodulating and processing circuit 31' does not include the TCT 66 which is used in the disc player shown in FIGS. 11A through 11C, and the output data of the de-interleave and error correction circuit 52 is also supplied to a window property memory device 90. The window property memory device 90 is made up of a RAM 91 having memory addresses corresponding to all "fonts" on the picture having 50 "fonts" in the row direction and 18 "fonts" in the column direction, and capable of storing 2 bits of data in each memory address, and a memory control circuit 92. The memory control circuit 92 is configured to perform control operations of: detecting the data indicating the position of window and the data indicating the mixing ratio, from among the data outputted from the de-interleave and error correction circuit 52, in accordance with the mode and the sort of the instruction indicated by the output of the mode/instruction decoder 53; writing data indicating the detected mixing ratio in the memory addresses of the RAM 91 corresponding to the "fonts" in the window; writing data corresponding to the mixing ratio of 0% of the video format signal obtained from the subcode in the memory address corresponding to the "fonts" outside the window, and sequentially reading-out the recorded contents of the RAM 91 in a predetermined order in accordance with the horizontal and vertical synchronizing signals h, and v. Output data of this window property memory 90 device is supplied to a switch control circuit 93. The switch control circuit 93 is configured to supply a control signal corresponding to the mixing ratio of each "font", which is indicated by the output data of the window property memory device 90, to the video switch 33.

On the other hand, in the video switch 33, the video format signal obtained from the subcode is directly supplied to a stationary contact u of a changeover switch 95, and also to stationary contacts x and y thereof through resistors $R_4$ and $R_5$. No connection is made to the stationary contact z of the changeover switch 95. The changeover switch 95 is configured to selectively output one of the signals at the stationary contacts u, x, y, and z by moving a movable contact t thereof to contact with one of the stationary contacts u, x, y and z in accordance with the control signal outputted by the switch control circuit 93. On the other hand, the video format signal from the video format signal demodulating and processing circuit 30 is directly supplied to a stationary contact z of a changeover switch 96, and also supplied to stationary contacts y and x thereof through resistors $R_6$ and $R_7$. No connection is made to a stationary contact z of the changeover switch 96. The changeover switch 96 is, like the changeover switch 95, constructed to connect a movable contact t to one of the stationary contacts u, x, y, and z in accordance with the control signal. The movable contacts t, t of the changeover switches 95 and 96 are mutually connected with each other. A signal of mixture between the video format signal from the video format signal demodulating and processing circuit 30 is derived at the common connection node J of the movable contacts t, t. When the movable contacts t, t of the changeover switches 95 and 96 are connected to the stationary contacts u, u, the mixing ratio of the video format signal obtained by the subcode becomes equal to 100%, and this mixing ration becomes equal to 0% when the movable contacts t, t of the changeover switch 95 and 96 are connected to the stationary contacts z, z. On the other hand, the resistance value of the resistors $R_4$ through $R_7$ are determined so that the mixing ration becomes equal to 70% when the movable contacts t, t are connected to the stationary contacts x, x, and it becomes equal to 30% when the stationary contacts t, t are connected to the movable contacts y, y. The signal derived at the common connection node J is supplied to the video output terminal $OUT_3$.

With the above described arrangement, the color data of the designated 16 colors out of the 4096 colors are also held in the CLUT 58 when the "load CLUT color 0 through color 7" instruction and "load CLUT color 8 through color 15" instruction are decoded by the mode/instruction decoder 53.

Subsequently, picture data of 16 channels are stored in the RAMs 56a through 56p of the picture memory device 55 and the decode of the "write font foreground/background" instruction. When one of the color data of 16 channels is designated by a data d based on the key operation in the operation part 60, picture data of the designated channel is sequentially outputted from the picture memory device 55 and in turn supplied to the CLUT 58. Consequently, the color data of the color number indicated by the picture data is outputted from the CLUT 58. Then a video signal based on this color data is outputted from the analog-to-video converting circuit 65 and in turn supplied to the video switch 33.

In this state, if the "window set" instruction is decoded, data indicating the mixing ratio of 10% for the video format signal obtained from the subcode is stored in the memory addresses of the RAM 91 of the window property memory device 90 corresponding to the "fonts" outside the window designated by the "window set" instruction. Data indicating the mixing ratio designated by the "window set" instruction is written in the memory addresses corresponding to the "fonts" within the window. The data read-out from the RAM 90 of the window property memory device 91 is supplied to the video switch 33, so that the mixing ratio between the video format signal outputted from the analog-to-video converting circuit 65 and the video format signal outputted from the video format signal processing circuit 30 is controlled for each "font". Thus, the same function as that in the disc player shown in FIGS. 11A through 11C is attained.

In addition, in the embodiment described above, the recording medium on which the subcode carrying picture information is recorded is a composite disc generally designated a CDV. However, it is of course possible to use, as the recording medium on which the subcode carrying the picture information is to be recorded, other type of recording medium such as a disc designated as LDD, i.e., a disc on which an FM-modulated video format signal, an audio signal, and a digital audio signal are record by multiplexing, by using a frequency multiplexing system, and so on.

The construction of the system to be used for playing a disk called LDD, i.e. a disk on which an FM modulated video format signal, an audio signal and a digital audio signal are recorded by multiplexing, will be explained with reference to FIGS. 29A-29C of the accompanying drawings.

Figures 29, 29A:
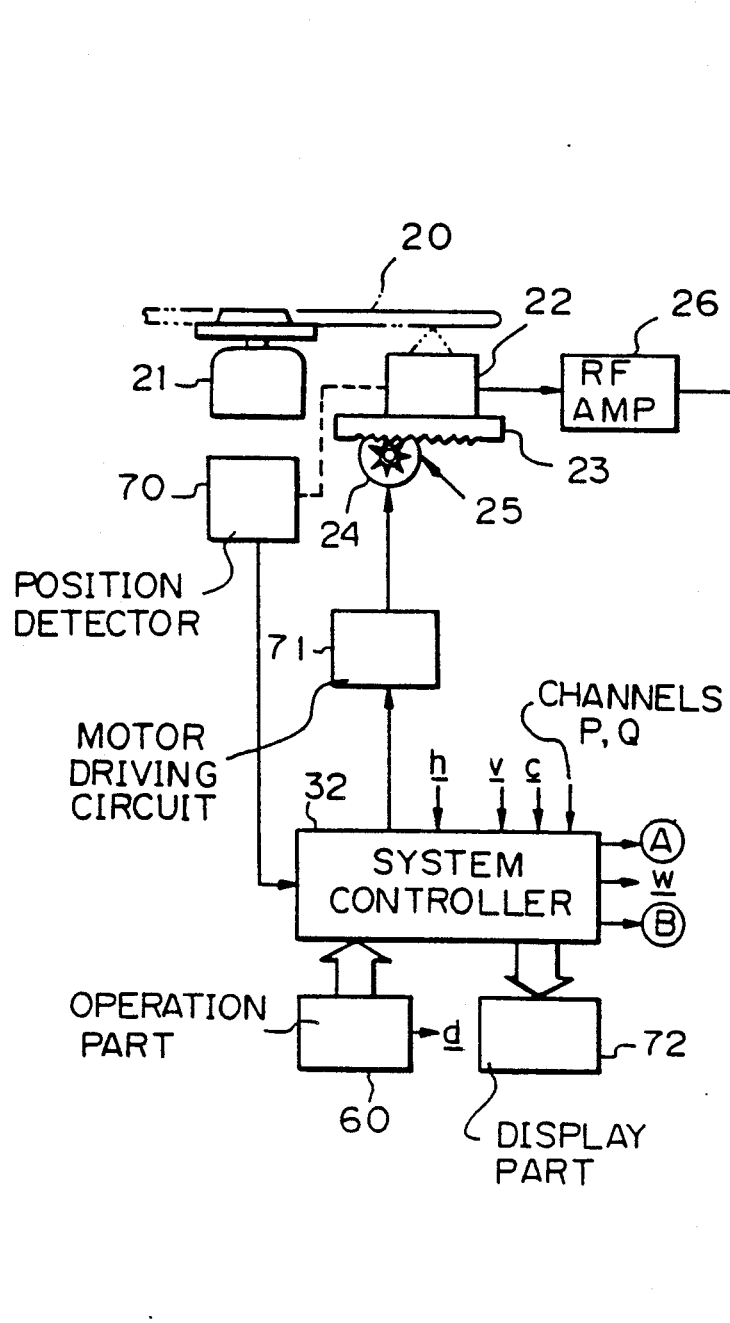
FIGS. 29A through 29C, when combined, are a block diagram showing a further example of the apparatus for reproducing picture information according to the present invention.
FIG. 29 is a diagram showing the arrangement of FIGS. 29A through 29C.
Figure 29B:
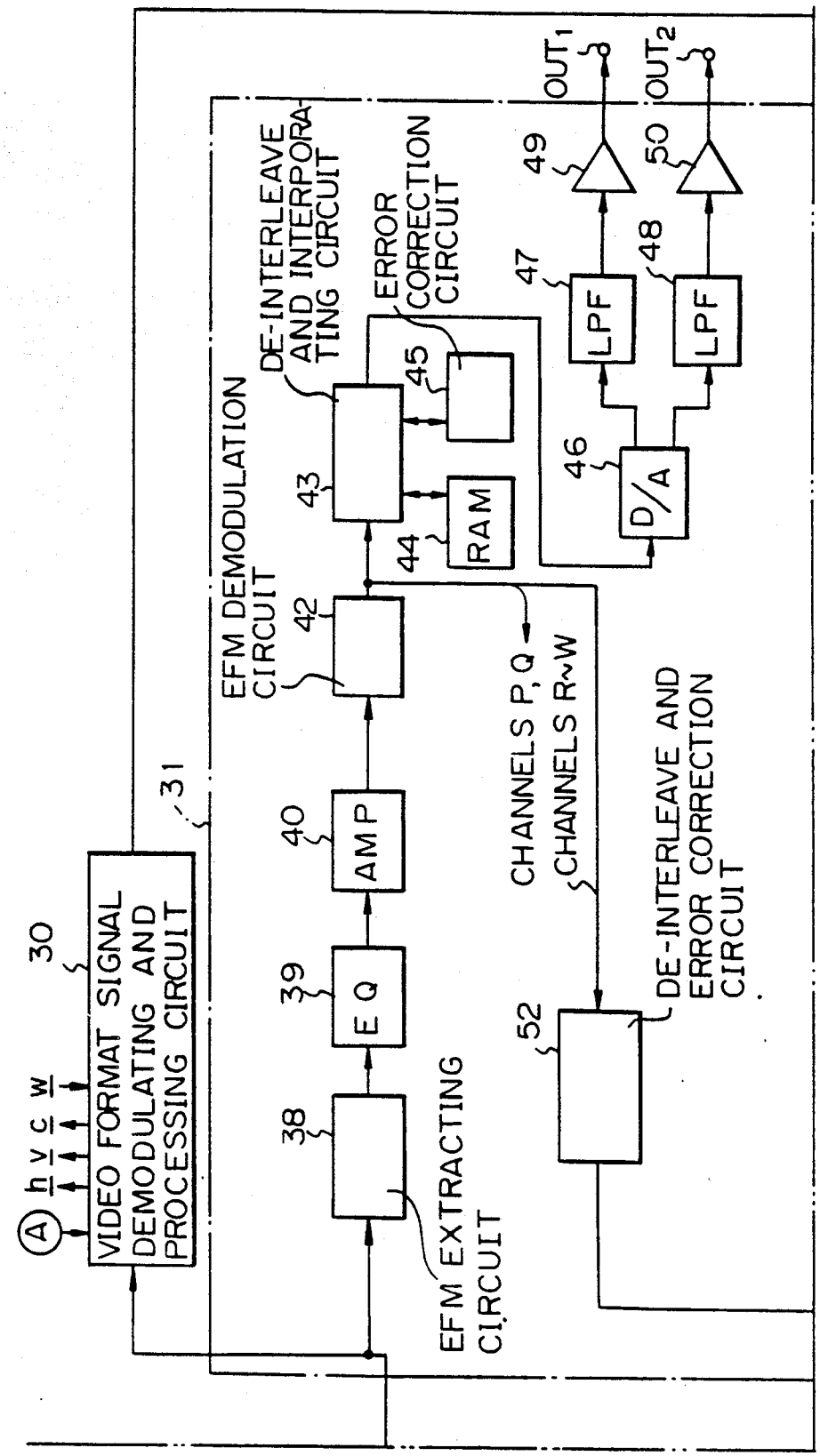
Figure 29C:
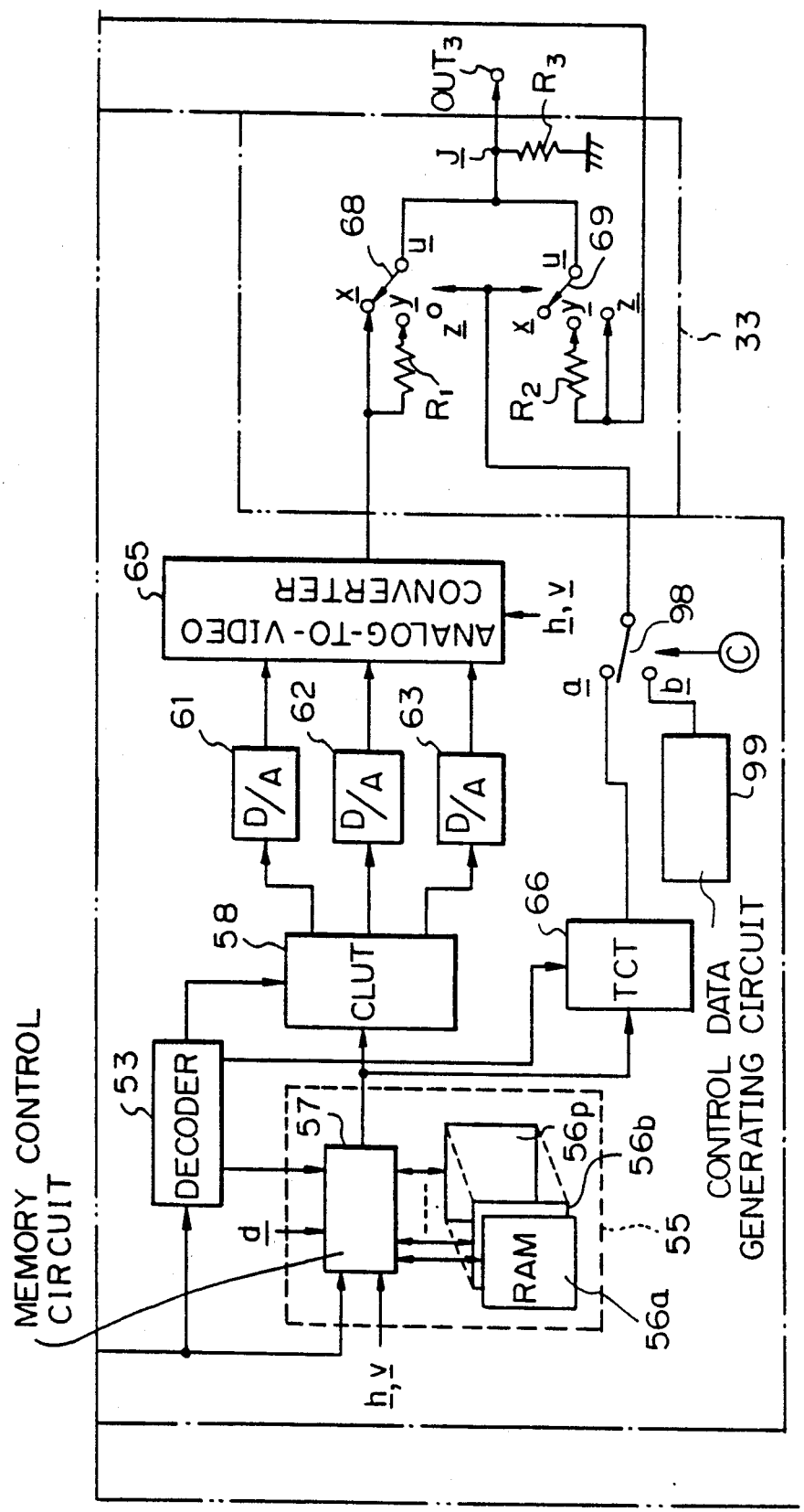

As shown in the block diagram of FIG. 29A through 29C, elements of this system, i.e. the disk 20, spindle motor 21, pickup 22, slider 23, slider motor 24, transmission mechanism 25, RF amplifier 26, video format signal processing circuit 30, coded information signal demodulating and processing circuit 31, system controller 32, video switch 33, operation part 60, position detecting circuit 70, motor driving circuit 71, and display part 72 are connected in the same manner as the system shown in FIGS. 11A through 11C.

However, in the coded information signal demodulating and processing circuit 31 of this player, the selector switch 35, equalizer circuit 36, and amplifier 37 are removed from the structure shown in FIGS. 11A through 11C, and the output signal of the TCT 66 is supplied to one input terminal of a selector switch 98. A control data generating circuit 99 is provided and its output signal is supplied to the other input terminal of the selector switch 98. The selector switch 98 is configured such that it is normally operated at a switch position b for selectively transmit the output signal of the control data generating circuit 99 and is operated to a switch position a in response to a change over command supplied from the system controller 32, to selectively transmit the output signal of the TCT circuit 66.

The control data generating circuit 99 is configured to generate a data for controlling the movable contacts u, u of the switches 68 and 69 of the video switch 33 to be connected to the stationary contacts z, z. Therefore, unless the selector switch 98 is operated to the switch position a in response to the changeover command from the system controller 32, only the video format signal outputted from the video format signal demodulating and processing circuit 30 is derived, so that mixing of the video format signal generated by the graphic code recorded as the subcode will not take place.

Figure 30A:
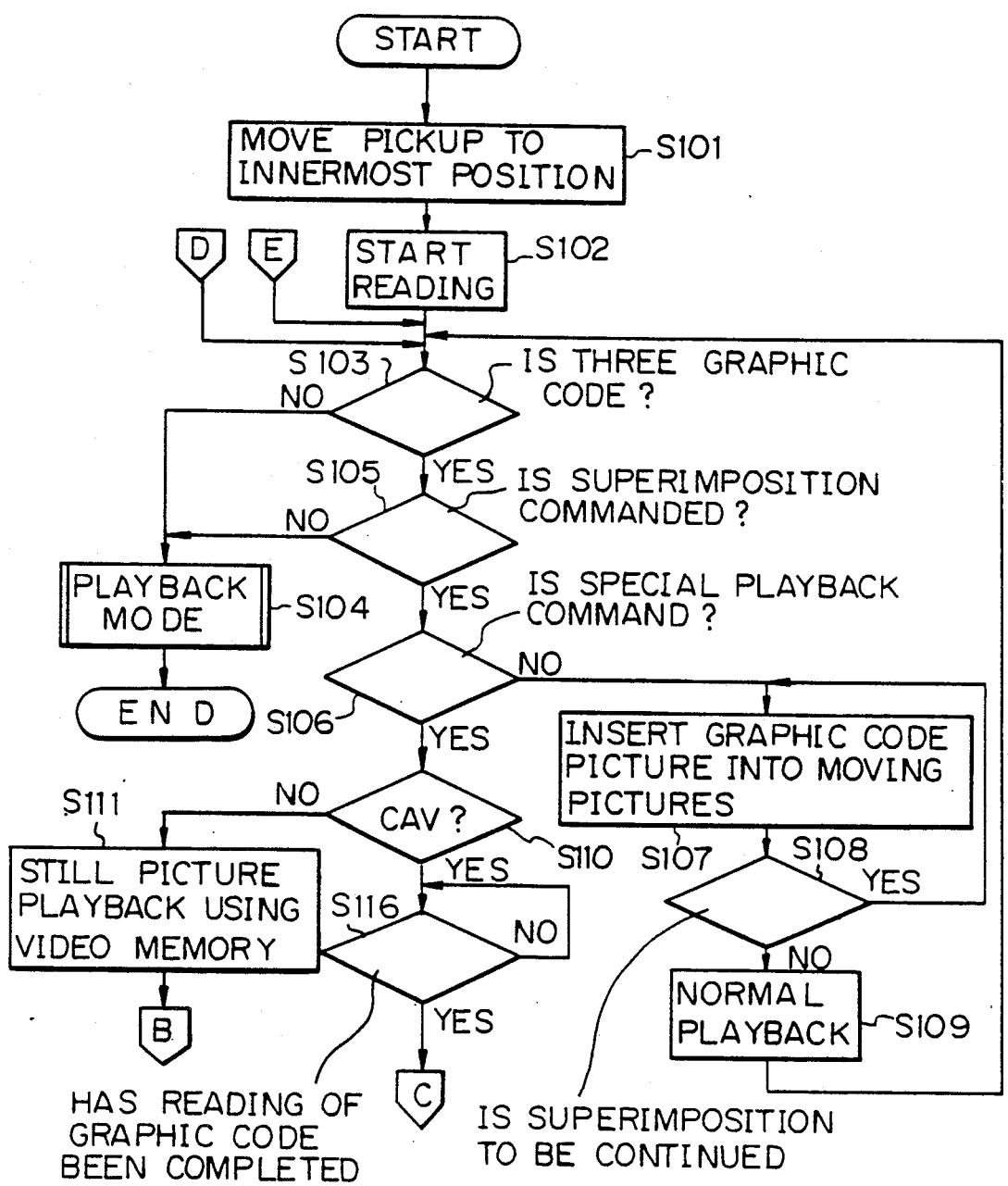
FIGS. 30A and 30B are flowcharts showing the operation of processor in system controller 32 of the apparatus shown in FIGS. 29A through 29C.
Figure 30:
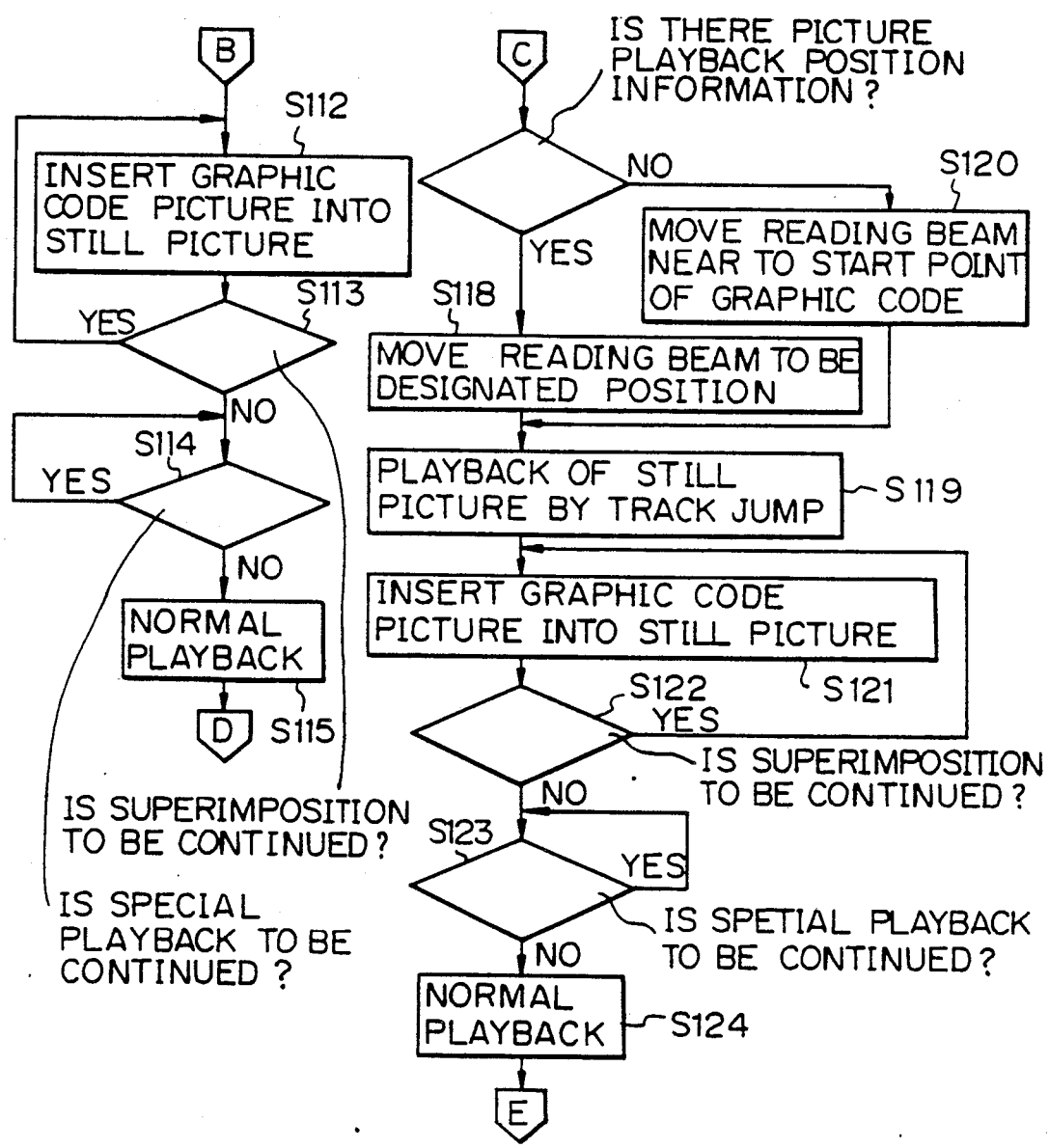

The operation of the processor in the system controller 32 of the above-described construction will be explained with reference to the flowcharts of FIGS. 30A and 30B.

It is assumed that a disk of the LDD (video disc with digital sound) type is already set in the playback position. When a start command is generated from the operation part 60 in this state, the processor transmits a drive command to the motor drive circuit 71, and the slider motor 24 is driven to move the pickup 22 to the innermost peripheral position of the disc (step S101). If it is detected, by a device not illustrated, that the pickup 22 has reached the innermost position, the processor performs the focusing operation of the pickup 22 and starts the reading of information recorded on the disc (step S102). Then, in accordance with the control data c outputted from the video format signal demodulating and processing circuit 30, the processor judges as to whether or not the graphic code is recorded as the subcode of the digital audio signal which is recorded together with the video format signal (step S103).

If the graphic code is not recorded, the processor proceeds to the normal playback mode (step S104), and continues the playback operation. Since the operations in the normal playback mode are well known, explanation thereof is omitted.

On the other hand, if the graphic code is recorded, the processor judges as to whether or not a superimpose command is issued from the operation part 60 (step S105).

If it is judged, in step S105, that the superimpose command is not issued, the processor proceeds to the step S104, to perform the normal playback mode. On the other hand, if it is judged in step S105 that the superimpose command is issued, the processor judges as to whether or not a special playback command is issued (step S106). If it is detected in step S106 that the special playback command is not issued, then the processor operates the selector switch 98 to the switch position a, so that the picture by the graphic code is inserted into the moving picture produced by the video format signal from the video format signal demodulating and processing circuit 30 (step S107).

After the execution of the operation of the step S107, the processor judges as to whether or not the superimpose command is continuously issued from the operation part 60 (step S108). If it is judged in step S108 that the superimpose command is not issued, the processor operates the selector switch 98 to the switch position b, to stop the insertion of the picture by the graphic codes into the moving picture, so that playback operations the same as those in the normal playback mode will be performed (step S109). Then the processor proceeds to the step S103.

If it is judged in step S106 that the special playback command is issued, then the processor judges as to whether or not the disc being played is a CAV (constant angular velocity) disc (step S110). If it is judged in step S110 that the disc 20 is not a CAV disc, the processor operates each part of the system so that a still picture playback operation using the video memory 83 will be performed, since in this case the disc being played is a CLV disc (step S111). At the same time, the processor operates the selector switch 98 to the switch position a, so that the picture by the graphic code is inserted into the still picture by the video format signal from the video format signal demodulating and processing circuit 30 (step S112). The still picture playback operation using the video memory 83 in step S111 is specifically performed such that a write enable signal w is transmitted for the period of one field (or one frame) by the vertical synchronizing signal v so that video information of one field long (or one frame long) is written in the video memory 83, and at the same time the selector switch 80 is operated to the switch position b.

After the execution of the operation in Step S112, the processor judges as to whether or not the superimpose command is continuously issued (step S113). If it is judged in step S113 that the superimpose command is continuously issued, the processor again proceeds to step S112. If on the other hand, it is judged in step S113 that the superimpose command is not generated, the processor operates the selector switch 98 to the switch position b, to stop the insertion of the picture by the graphic code to the still picture, and repeatedly judges as to whether or not the special playback command is issued continuously (step S114). If it is judged that the special playback command is not generated, the processor operates the selector switch 80 to the switch position a so that the normal playback is performed (step S115), and again proceeds to the step S103.

On the other hand, if it is judged in step S110 that the disk 20 is a CAV disk, the processor repeatedly judges as to whether or not the graphic code corresponding to one picture is read by the control data c outputted from the video format signal demodulating and processing circuit 30 (step S116). When the graphic code corresponding to one picture has been read, the processor judges as to whether or not information of the picture playback position corresponding to the graphic code is included in the control data c outputted from the video format signal demodulating and processing circuit 30 (step S117).

If it is judged in step S117 that the picture playback position information is included in the data c, the processor transmits a drive command to the motor drive circuit 71, to move the information reading beam of the pickup 22 to the position indicated by the picture playback position information (step S118), and starts the still picture playback operation where the information reading light spot of the pickup 22 is jumped by one track every one revolution of the disc 20 (step S119).

On the other hand, if it is judged in step S117 that the picture playback position information is not included, the processor transmits the drive command to the motor driving circuit 71, to move the information reading beam of the pickup 22 near to a start position of the recording of the graphic code (step S120), and in turn the processor proceeds to the step S119.

After the execution of the operation in the step S119, the processor operates the switch 98 to the switch position a so that the picture by the graphic codes is inserted into the still picture by the video format signal from the video formal signal demodulating and processing circuit 30 (step S121), and judges as to whether or not the superimpose command is continuously generated (step S122). If it is judged in step S122 that the superimpose command is continuously issued, then the processor again proceeds to the step S121. If, on the other hand, it is judged in step S122 that the superimpose command is not issued, the processor operates the selector switch 98 to the switch position b, to stop the insertion of the picture by the graphic codes to the still picture, and judges once more as to whether or not the special playback command is continuously issued (step S123).

If it is judged in step S123 that the special playback command is not issued, the processor stops the still picture playback operation by the one-track jumping so that the normal playback operation is performed, and subsequently the processor proceeds to the step S103 once more.

If the superimpose command by the key operation in the operation part 60 is not issued in step S105 of the above-described operation, the normal playback operation is performed by proceeding to the step S104 even if the graphic codes are recorded. Thus, the insertion of the graphic code to the picture by the video format signal recorded after being modulated by the FM modulation takes place only when the superimpose command is issued by the key operation in the operation part 60.

On the other hand, when the special playback command is issued by the key operation in the operation part 60, one field (or one frame) of the video format signal recorded on the disc after being FM-modulated is written into the video memory and in turn repeatedly read-out to reproduce a still picture while the reading of the information is continuously performed, these operation being performed through steps S106 and S110-S113, in the case of the CLV disc. In this way, pictures by the graphic codes which are sequentially reproduced in the order of recording are inserted into the still picture by the video format signal written in the video memory.

In the case of the CAV disc, image by the graphic codes having the length corresponding to one picture is inserted into a still picture by the video format signal which is recorded after being FM-modulated in the designated position or in the vicinity of the start point from which the recording or graphic codes is started, these operations being performed through steps S110 and S116–S122.

In addition, if the special playback command by the key operation in the operation part 60 is not issued, the picture by the graphic codes is inserted into the moving picture by the video format signal recorded after being FM-modulated, through steps S107–S109.

As specifically described in the foregoing, the system of recording and reproducing picture information according to the present invention is configured to record, in addition to a video format signal and a coded information signal, graphic codes including picture information as the subcode of the coded information signal on a recording medium, and at the time of playback of the recording medium, a signal corresponding to the graphic codes is mixed with the video format signal. Therefore, pictures produces from the subcode related to the picture produced from the video format signal are superimposed on the picture produced from the video format signal only by sequentially processing the signal obtained from the recording medium. In this way, reproduced pictures with full of variety and viewable without generating the sense of incompatibility can be readily produced.

What is claimed is:

1. A recording and reproducing method comprising the steps of:
   recording a video format signal and a coded information signal on a recording medium, graphic codes including picture information being provided as a subcode of said coded information signal, said graphic codes including mixing ratio information;
   playing back said recording medium, comprising the steps of:
      generating a still picture video formal signal from said video format signal read-out from said recording medium;
      generating a signal corresponding to said graphic codes; and
      mixing said signal corresponding to said graphic codes with said still picture video format signal in accordance with said mixing ratio information contained in said graphic codes.

2. A recording and reproducing method as set forth in claim 1, wherein said still picture video format signal generating step comprises the steps of:
   writing portions of said video format signal readout from said recording medium which correspond to predetermined periods, into a memory; and
   producing said still picture video format signal by repeatedly reading a content stored in said memory; and
   wherein said mixing step is operative to mix said signal corresponding to the graphic code successively read-out from said recording medium with said still picture video format signal.

3. A recording and reproducing method as set forth in claim 2, further comprising a step of generating, at the time of playback of said recording medium, a superimposition command in response to an operation by a user, and wherein said mixing step is adapted to mix said signal corresponding to the graphic code successively read-out from said recording medium with said still picture video format signal only when said superimposition command is present.

4. An apparatus for playing a picture information recording medium on which are recorded a video format signal and a coded information signal, graphic codes including picture information being inserted as a subcode of said coded information signal, said graphic codes including mixing ration information, said apparatus comprising:

pickup means for reading signals recorded on said recording medium and generating a pickup output signal;
   video format signal demodulating means for demodulating said video format signal from said pickup output signal;
   memory means;
   still picture video format signal producing means for producing a still picture video format signal by writing a portion of said video format signal corresponding to a predetermined period of said vide format signal into said memory means, and repeatedly reading a stored content of said memory means;
   coded information signal demodulating means for demodulating said coded information signal from said pickup output signal;
   graphic codes demodulating means for demodulating said graphic codes from an output signal of said coded information signal demodulating means;
   means for generating signals corresponding to said graphic codes from an output signal of said graphic codes demodulating means; and
   mixing means for mixing said signals based on said graphic codes with said picture video format signal in accordance with information of mixing ration information contained in said graphic codes.

5. An apparatus as set forth in claim 4, further comprising means for generating a superimposition command in response to an operation by a user of the apparatus, and wherein said mixing means is adapted for mixing sand signals corresponding to said graphic codes with said still picture video format signal only when said superimposition command is present.

6. A method of recording and reproducing audio and video information to and from a recording medium comprising the steps of:
   generating a video format signal to be recorded on the disk;
   generating an audio signal to be recorded on the disk;
   generating graphic codes representative of picture information and instruction code information for superimposing the picture information on the video format signal, said graphic codes including mixing ratios for mixing the picture information of the graphic codes with the video format signal;
   digitizing the audio signal to generate a digital audio signal;
   inserting the graphic codes as a subcode to the digital audio signal to form a coded information signal;
   frequency modulating the video format signal to generate a frequency modulated video format signal;
   superimposing the coded information signal on the frequency modulated video format signal;
   recording the coded information signal and the frequency modulated video format signal with the superimposed coded information signal on the disk;
   reproducing the audio and video information from the disk comprising the steps of:
      reading the frequency modulated video format signal and superimposed coded information signal from the outer periphery recording area of the disk;
      demodulating the frequency modulated video format signal and the superimposed coded information signal to obtain the video format signal and the coded information signal;

storing one frame of the video format signal in a memory while reading from the outer periphery recording area of the disk;

repeatedly reading said frame of the video format signal stored in the memory for display as a still picture; and mixing the picture information corresponding to the graphic codes with said frame of the video format signal in accordance with the mixing ratios contained in the graphic codes.

7. The method of claim 6, wherein the step of generating the graphic codes comprises the step of generating a subcode block comprising a predetermined number of subcodes, each of said subcodes comprising a fixed number of subcode binary bits, a subcode symbol being defined by a preset number of adjacent subcode binary bits, said picture information comprised of a plurality of fonts having a plurality of pixels and being represented by said subcode symbol, each of said subcodes having a corresponding subcode symbol, a symbol pack being defined by a predetermined number of subcode symbols which is a fraction of said predetermined number of subcodes, each symbol pack having a data field comprising a preset number of subcode symbols for specifying a characteristic of a particular font of the picture information, each symbol pack further comprising mode and instruction subcode symbols for specifying the manner in which the picture information is superimposed on the video format signal, a subset of said symbols of said data field being dedicated to specifying the color of groups of pixels of the particular font specified by the corresponding symbol pack, the mixing ration of the groups of pixels in the particular font being defined in terms of said subset of symbols.

\* \* \* \* \*